(12) United States Patent
Gallagher et al.

(10) Patent No.: US 7,663,671 B2
(45) Date of Patent: Feb. 16, 2010

(54) LOCATION BASED IMAGE CLASSIFICATION WITH MAP SEGMENTATION

(75) Inventors: Andrew C. Gallagher, Brockport, NY (US); Bryan D. Kraus, Rochester, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 608 days.

(21) Appl. No.: 11/284,927

(22) Filed: Nov. 22, 2005

(65) Prior Publication Data

US 2007/0115373 A1    May 24, 2007

(51) Int. Cl.
*H04N 5/76* (2006.01)
*H04N 5/222* (2006.01)

(52) U.S. Cl. .............................. 348/231.2; 348/333.05

(58) Field of Classification Search .............. 348/231.3, 348/158, 46, 231.99, 231.2, 231.5, 231.9, 348/333.05; 707/100; 386/46
See application file for complete search history.

(56) References Cited

U.S. PATENT DOCUMENTS

| | | | |
|---|---|---|---|
| 5,164,831 A | | 11/1992 | Kuchta et al. |
| 6,351,556 B1 | | 2/2002 | Loui et al. |
| 6,437,797 B1 * | | 8/2002 | Ota .............................. 345/638 |
| 6,504,571 B1 | | 1/2003 | Narayanaswami et al. |
| 6,606,411 B1 | | 8/2003 | Loui et al. |
| 6,741,864 B2 * | | 5/2004 | Wilcock et al. .......... 455/456.1 |
| 6,757,740 B1 | | 6/2004 | Parekh et al. |
| 7,526,718 B2 * | | 4/2009 | Samadani et al. ............ 715/201 |
| 2001/0015756 A1 * | | 8/2001 | Wilcock et al. ............. 348/158 |
| 2001/0017668 A1 | | 8/2001 | Wilcock et al. |
| 2002/0161720 A1 | | 10/2002 | Hamazaki et al. |
| 2003/0004916 A1 | | 1/2003 | Lewis |
| 2003/0078078 A1 | | 4/2003 | King et al. |
| 2003/0083108 A1 | | 5/2003 | King et al. |
| 2003/0103086 A1 | | 6/2003 | Robinson et al. |
| 2003/0117297 A1 | | 6/2003 | Obradovich et al. |
| 2004/0218895 A1 * | | 11/2004 | Samadani et al. ............. 386/46 |
| 2005/0027712 A1 * | | 2/2005 | Gargi et al. ................. 707/100 |

FOREIGN PATENT DOCUMENTS

EP    WO 02/17567  A2    2/2002

OTHER PUBLICATIONS

"Pattern Recognition Engineering", by Morton Nadler and Eric P. Smith, John Wiley & Sons, Inc., 1993, pp. 294-328.

(Continued)

*Primary Examiner*—Nhan T Tran
*Assistant Examiner*—Ahmed A Berhan
(74) *Attorney, Agent, or Firm*—Robert L. Walker; Justin D. Petruzzelli

(57) ABSTRACT

In methods and systems for classifying capture records, such as images. A collection of capture records is provided. Each capture record has metadata defining a map location. This metadata can be earlier determined from a stream of data transmissions, even if there are gaps in transmission. The provided capture records are clustered into groups based on capture locations. A map, inclusive of the capture locations, is segmented into a plurality of regions based on relative positions of the capture locations associated with each group. The regions are associated with the capture records of respective groups.

49 Claims, 13 Drawing Sheets

OTHER PUBLICATIONS

Fundamentals of Digital Image Processing, Anil K. Jain, University of California, David, Prentice Hall, Englewood Cliffs, NJ 07632, ISBN 0-13-336165-9, pp. 249-251.

U.S. Appl. No. 10/997,411, "Variance-based Event Clustering" filed on Nov. 17, 2004, by Alexander Loui and Bryan D. Kraus.

U.S. Appl. No. 11/197,243, "Multi-Tiered Image Clustering By Event" filed on Aug. 4, 2005, by Bryan D. Kraus and Alexander Loui, (Continuation-in-Part).

Ming-Yang Chern: "Knowledge-based region classification for locating rural road area in the color scene image", Networking, Sensing and Control, 2004 IEEE International Conference on Taipei, Taiwan Mar. 21-23, 2004, Piscataway, NJ, USA, IEEE, vol. 2, Mar. 21, 2004, pp. 891-896, XP010705661, ISBN: 0-7803-8193-9.

Kentaro Toyama, Ron Logan, Asta Roseway, P. Anandan: "Geographic Location Tags on Digitial Images", Microsoft Reserach, [Online] Nov. 2, 2003, XP002420408, Redmond, WA, Retrieved from the Internet: URL :http://wwmx.org/docs/wwmx_acm2003.pdf> [retrieved on Feb. 15, 2007].

Gerald Fritz, Christin Seifert, Lucas Paletta: "Urban Object Recognition from Informative Local Features", Proceedings from the 2005 IEEE, [Online] Apr. 2005, pp. 131-137, XP002420409, Barcelona, Spain, Retrieved from the Internet: URL :http://ieeexplore.ieee.org/>.

Iwan Ulrich, Illah Nourbakhsh: "Appearance-Based Place Recognition for Topological Localization", IEEE International Conference on Robotics and Automation, [Online], Apr. 2000, pp. 1023-1029, XP002420410, Pittsburgh, PA, Retrieved from Internet: URL :http://www.es.cmu.edu/{illah/PAPERS/localization.pdf>.

M. Gianinetto, A. Giussani, G.M. Lechi, M. Scaioni: "Fast Mapping" From High Resolution Satellite Images: A Sustainable Approach to Provide Maps for Developing Countries, The International Archive of the Photogrammetry, Remote Senseing and Spatial Information Systems, [Online] Jul. 12, 2004, XP002420411, Istanbul, Turkey, Retrieved from the Internet: URL :http://www.isprs.org/istanbul2004/comm6/papers/676.pdf>.

* cited by examiner

LOCATION BASED IMAGE CLASSIFICATION WITH MAP SEGMENTATION

CROSS REFERENCE TO RELATED APPLICATIONS

Reference is made to commonly-assigned copending U.S. Ser. No. 10/413,673, entitled "A METHOD FOR AUTOMATICALLY CLASSIFYING IMAGES INTO EVENTS" and filed 15 Apr. 2003 in the names of Alexander C. Loui and Eric S. Pavie, and commonly-assigned copending U.S. Ser. No. 10/706,145, entitled "A METHOD FOR AUTOMATICALLY CLASSIFYING IMAGES INTO EVENTS" and filed 12 Nov. 2003 in the names of Alexander C. Loui, and Eric S. Pavie, and commonly-assigned copending U.S. Ser. No. 10/696,115, entitled "A METHOD FOR AUTOMATICALLY CLASSIFYING IMAGES INTO EVENTS" and filed 29 Oct. 2003 in the names of Alexander C. Loui, and Eric S. Pavie, all of which are incorporated herein by reference.

Reference is made to commonly assigned, co-pending U.S. patent application Ser. No. 10/997,411, entitled: VARIANCE-BASED EVENT CLUSTERING, filed Nov. 17,2004, in the name(s) of Alexander C. Loui and Bryan D. Kraus.

Reference is made to commonly assigned, co-pending U.S. patent application Ser. No. 11/197,243, entitled: MULTI-TIERED IMAGE CLUSTERING BY EVENT, filed Aug. 4, 2005, in the name(s) of Bryan D. Kraus and Alexander C. Loui.

FIELD OF THE INVENTION

The invention relates to classification of images and other captured records and more particularly relates to methods and systems for location based classification that segment maps based on clustering results.

BACKGROUND OF THE INVENTION

The rapid proliferation of digital images has increased the need to classify images for easier retrieving, reviewing, and albuming of the images. The same need applies to other types of capture records, such as video sequences, audio sequences, and combinations of image and sound records.

Pictorial images and other captured records are often classified by event, for convenience in retrieving, reviewing, albuming, and otherwise manipulating the records. Manual and automated methods have been used. In some cases, images and other records have been further classified by dividing events into subevents. Further divisions are sometimes provided.

Although the presently known and utilized methods for partitioning images are satisfactory, there are drawbacks. Manual classification is effective, but is slow and burdensome unless the number of images is small. Automated methods are available, but tend to have a number of constraints, such as inherent inaccuracy due to lack of consistency, flexibility, and precision. Some automated methods partition images into groups having similar image characteristics based upon color, shape or texture. This approach can be used to classify by event, but is inherently difficult when used for that purpose.

Many images are accompanied by metadata, that is, associated non-image information that can be used to help grouping the images. One example of such metadata is chronological data, such as date and time, and geographic data, such as Global Positioning System ("GPS") geographic position data. These types of data can be used to group by location and can also be used for grouping by event, since events are usually limited both temporally and spatially. Users have long grouped images manually by looking at each image and sorting by chronology and geography. "Home Photo Content Modeling for Personalized Event-Based Retrieval", Lim, J-H, et al., *IEEE Multimedia*, Vol. 10(4), October-December 2003, pages 28-37 suggests use of chronological and geographic data in automated image classification by event using image content.

U.S. Patent Application Publication No. 2001/0017668A1, filed by Wilcock et al., discloses augmenting image recordings with location information determined from transmitted geolocation signals and with date/time stamps and other metadata. Time stamps of image recordings and location information are correlated with user intervention where needed. The metadata can include semantic information, which is described as a user-meaningful location description.

U.S. Pat. No. 6,504,571 discloses a searchable database, in which a query about a particular region of interest retrieves images having associated location data within a map boundary determined for that particular region of interest.

In the above patent references, images are tied to geographic location information and preexisting map regions. The above patent references do not differentiate images in relation to different ranges of geographic areas. This is shortcoming, since many people tend to take pictures over different ranges of geographic area. Some sequences of pictures are taken within a small area. An example is pictures taken at home within a house and yard or at the house of a friend or neighbor. Other sequences span large areas. An example is pictures taken on a vacation trip. Similar results are seen for other captured records, such as video sequences.

It would thus be desirable to provide image organization that groups images and relates images to a map, but that more closely matches picture taking over different ranges of geographic areas.

SUMMARY OF THE INVENTION

The invention is defined by the claims. The invention, in broader aspects, provides methods and systems for classifying capture records, such as images. A collection of capture records is provided. Each capture record has metadata defining a map location. This metadata can be earlier determined from a stream of data transmissions, even if there are gaps in transmission. The provided capture records are clustered into groups based on capture locations. A map, inclusive of the capture locations, is segmented into a plurality of regions based on relative positions of the capture locations associated with each group. The regions are associated with the capture records of respective groups.

It is an advantageous effect of the invention that improved methods and systems are provided, in which capture records are clustered based upon location information and a map is segmented into regions based upon the clustered capture records.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 5 is a diagram showing a scaled histogram of map locations of a set of images and, imposed on the histogram, the average, standard deviation, and event threshold.

FIG. 6 is a diagram of classification of images into events using an embodiment of the method of FIG. 1, in which map locations are distances between successive images.

DETAILED DESCRIPTION OF THE INVENTION

In the method, images or other captured records are clustered using capture locations and, optionally, a chronology, such as date-times of capture. A core location is designated for each group and a map that includes the capture locations is segmented relative to the core locations into regions that are then associated with the captured records of the respective groups.

The term "capture record" is used here to refer to reproducible recordings of images and sounds in any combination, for example, capture records include still images, video sequences, and sound recordings and also include more complex types of recordings, such as multiple spectrum images and scannerless range images.

The term "date-time" is used here to refer to time related information, such as a date and a time of day; however, a date-time can be limited to a particular unit of time, such as date information without times.

The term "chronology" is used here to refer to a relative order in time. A chronology may or may not include date-time information. Digital cameras commonly assign filenames to images in a sequential manner that establishes a chronology.

In the following description, some embodiments of the present invention will be described as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 3:
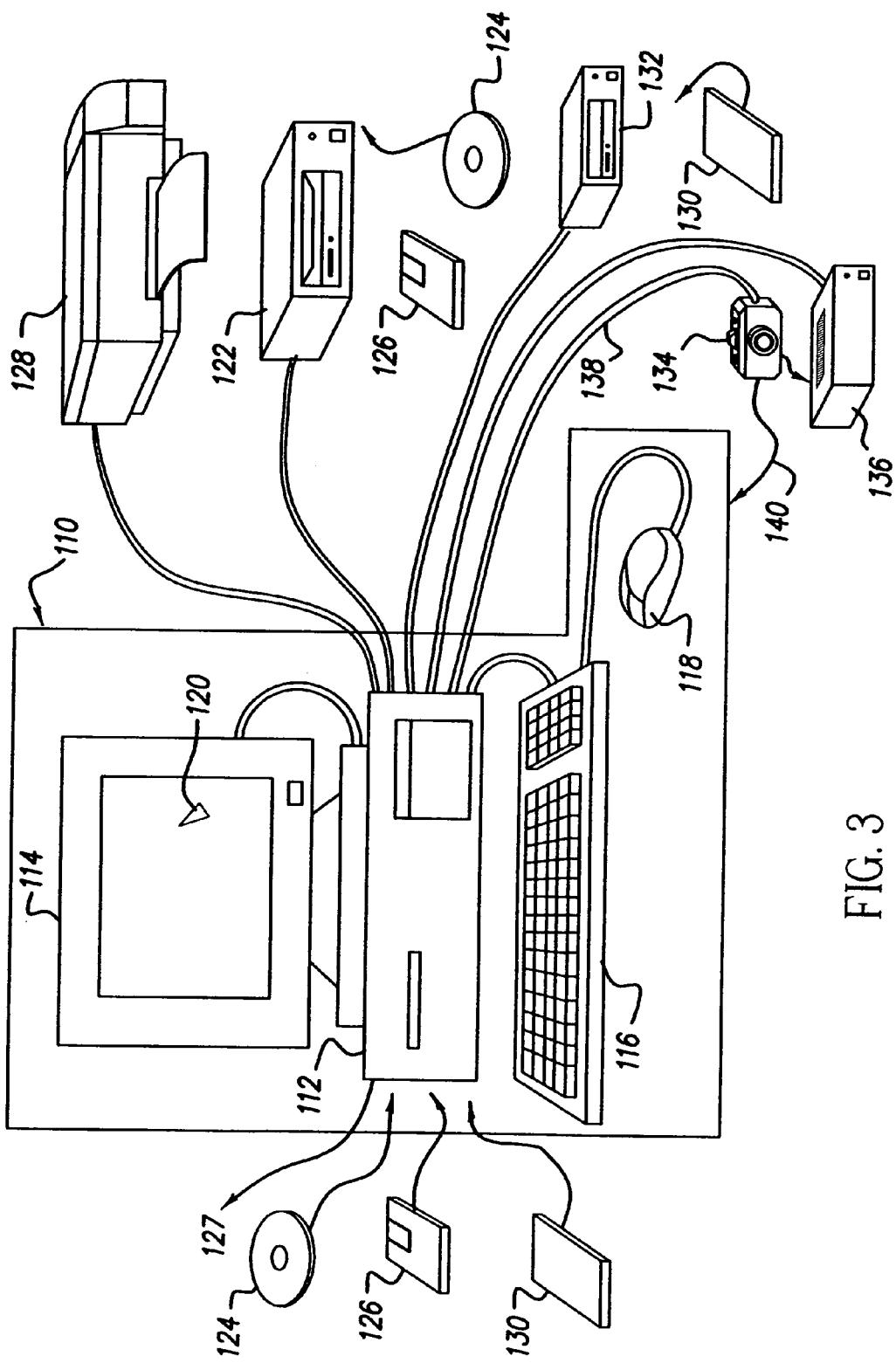
FIG. 3 is a diagrammatical view of an embodiment of the system.

The present invention can be implemented in computer hardware and computerized equipment. For example, the method can be performed using a system including one or more of a digital camera, a digital printer, and on a personal computer. Referring to FIG. 3, there is illustrated a computer system 110 for implementing the present invention. Although the computer system 110 is shown for the purpose of illustrating a preferred embodiment, the present invention is not limited to the computer system 110 shown, but may be used on any electronic processing system such as found in digital cameras, home computers, kiosks, retail or wholesale photofinishing, or any other system for the processing of digital images. The computer system 110 includes a microprocessor-based unit 112 (also referred to herein as a digital image processor) for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122, which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device provides a final image that has been subject to transformations. The output device can be a printer or other output device that provides a paper or other hard copy final image. The output device can also be an output device that provides the final image as a digital file. The output device can also include combinations of output, such as a printed image and a digital file on a memory unit, such as a CD or DVD.

The present invention can be used with multiple capture devices that produce digital images. For example, FIG. 3 can represent a digital photofinishing system where the image-capture device is a conventional photographic film camera for capturing a scene on color negative or reversal film, and a film scanner device for scanning the developed image on the film and producing a digital image. The capture device can also be an electronic capture unit (not shown) having an electronic imager, such as a charge-coupled device or CMOS imager. The electronic capture unit can have an analog-to-digital converter/amplifier that receives the signal from the electronic imager, amplifies and converts the signal to digital form, and transmits the image signal to the microprocessor-based unit 112.

The microprocessor-based unit 112 provides the means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

The general control computer shown in FIG. 3 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device. Before describing the present invention, it facilitates understanding to note that the present invention can be utilized on any well-known computer system, such as a personal computer.

It should also be noted that the present invention can be implemented in a combination of software and/or hardware and is not limited to devices, which are physically connected and/or located within the same physical location. One or more of the devices illustrated in FIG. 3 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments;

however, such embodiments are not mutually exclusive, unless so indicated or as are readily apparent to one of skill in the art.

Figure 1:
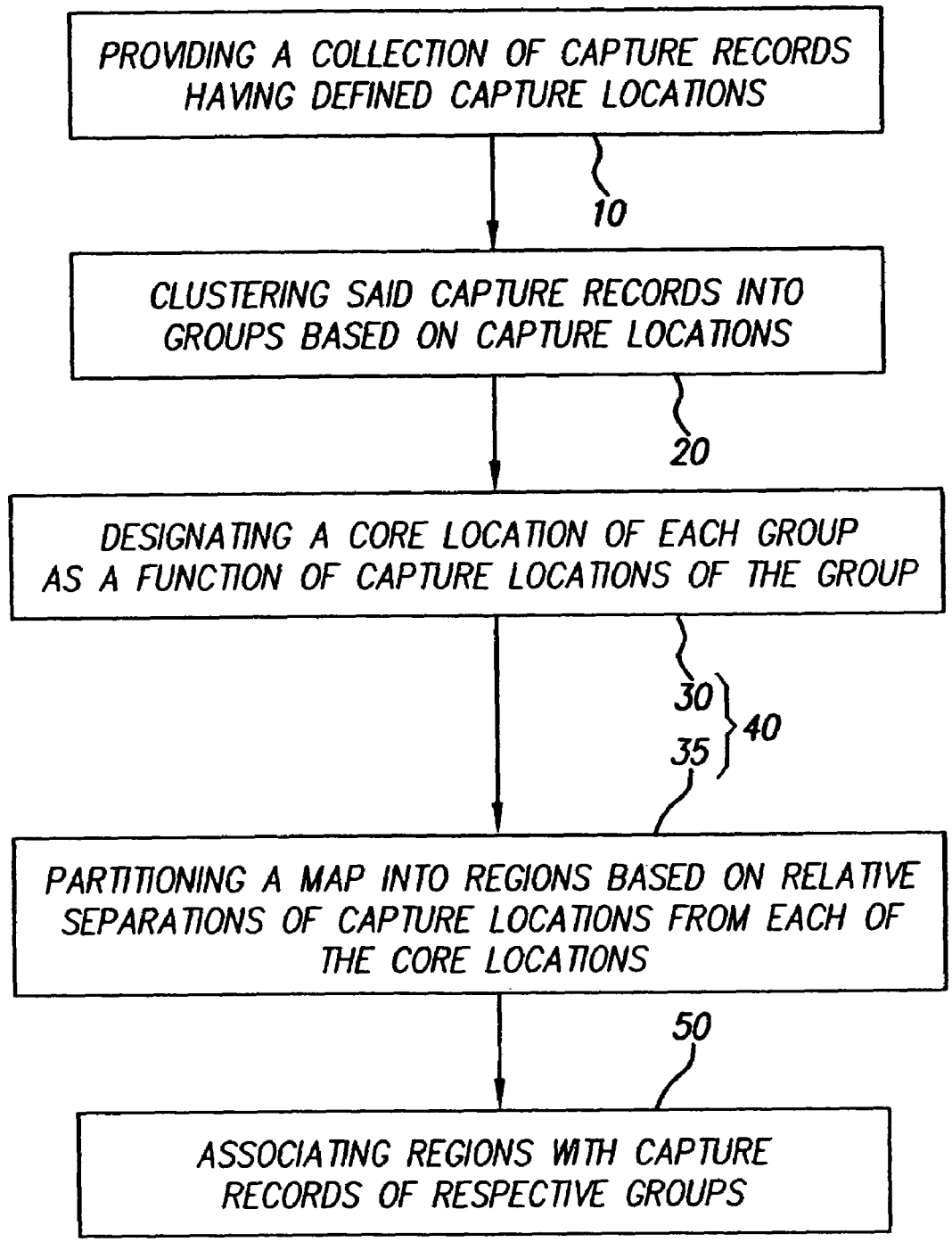
FIG. 1 is a flow chart of an embodiment of the method of the invention.

Referring to FIG. 1, in the methods and systems, a collection of capture records is provided (10) along with individual associated capture locations. The capture records can be captured earlier or as a part of that step. The capture records are each associated with or capable of being associated with a map location that can be localized on a map of a physical area. Prior to or during the methods, map locations are associated with all of the capture records in a collection.

The map locations are indicated by or derived from location information. The specific form of location information is not critical. Location information can be provided in addition to capture record content or can be derived from capture record content. Simple examples of derivable location information is place names determined from an analysis of images that locates road signs or from a similar analysis of recorded speech using speech recognition software. Location information that is provided in addition to capture record content is simpler to use.

For convenience, capture records are generally discussed here in terms of digital still images or digital video sequences captured at particular geographic locations that can be related to a geographic map. Different geographic locations can be uniform in size or can vary. For example, latitude and longitude measurements define areas of a set size. On the other hand, geographic locations defined by telecommunication cells vary depending upon output, antenna configuration, and the like. It will be understood that the methods and systems discussed here are not limited to digital capture records associated with a particular type of geographic locations. For example, the capture records can be provided in non-digital form, such as photographic prints or other hard copy images. Likewise, the locations for the capture records to be classified, can be the locations of the sites at which the information captured originated rather than the locus of a capture device at the time of capture. For example, this may be more useful than capture device locations when the images to be classified are from a remote sensing vehicle or satellite. The location need not be geographic. For example, images taken by a pill camera, a camera that can be swallowed to provide gastrointestinal imaging, can be classified by location in the gastrointestinal tract.

The map locations can be generalized as providing a difference from a reference or a difference internal to the data. The difference can be relative to an established standard, such as geographic coordinates. The difference can also be relative to an arbitrary reference. Likewise, a particular GPS coordinate set can be selected as an arbitrary starting point for later distance measurements. The reference itself does not have to be fixed in time or place. Distances can be relative to a reference camera or other movable feature. For example, images can be provided by a plurality of independently operated cameras. The movable reference can be a designated one of the cameras. In this case, the reference camera can have different absolute spatial locations when images are captured by the other cameras and the differences can be separations from the reference camera at the times of capture of different images. Other convenient differences are from nearest neighbors or the preceding image in an ordered sequence.

The location information can define exact locations (within applicable tolerances) determined at the time of image capture, but if that information is not available, locations can be assigned based upon the best available data (discussed below). Tolerances are predetermined and are dependent upon the technical limitations in the equipment used. Tolerances of locations associated with a collection of capture records can all be the same or can vary. Acceptable tolerances and mixtures of different tolerance ranges can be determined heuristically for a particular use.

Location information can also define different sizes of physical location. For example, GPS coordinates define a small geographic area, while the geographic area defined by a telecommunication cell is relatively large, depending upon such factors as output, antenna configuration and the like. User input location information can define a small area, such as an intersection of two streets or a larger area such as a city.

The location information can be provided, at the time of capture, in the form of a data transmission. The data transmission is any transmission of information that identifies the location of the capture device or the captured subject at the time of capture. Types of data transmissions include: locally and remotely transmitted location coordinates, identifications of cell sites, wired and wireless network addresses, and remotely transmitted and user input identifications. GPS (Global Positioning System) coordinates are particularly convenient, since a small geographic area is identified by particular coordinates.

The map locations can be determined by any of a number of methods. For example, the geographic location may be determined by receiving communications from the well-known Global Positioning Satellites (GPS). Cellular telephones, in some jurisdictions, have GPS or other positioning data available, which can be used to provide map locations. Alternatively, map locations can be indicated by identifications of transmission towers and use of triangulation. Features of the transmission towers can be kept in a database, which can be consulted in determining map locations from received transmissions.

Network node information can be used to identify a map location. In this case, the location information is supplied via a network interface, such as a dock interface 362 or a wireless modem 350. For example, the dock interface can use one of the IEEE 802.11 wireless interface protocols to connect to a wireless network. The location determiner can also use the MAC (Media Access Control) address of a wireless access point to provide location information that can be converted to a map location using a database relating MAC addresses to map locations. MAC addresses are permanently recorded in the hardware of wireless access point equipment. For example, the MAC address 48-3F-0A-91-00-BB can be associated with the location 43.15 degrees N, 77.62 degrees W. This approach rests upon an assumption that the map location in the database corresponds to the actual location of the equipment providing the MAC address. In a similar manner, a "traceroute" utility can be used that determines IP addresses (defined by the TCP/IP Protocol) of all routers from a client computer to a remote host that carry a particular message across the Internet to get an approximate idea of geographic location as described in U.S. Pat. No. 6,757,740 by Parekh et al., which is hereby incorporated herein by reference.

The map locations or location information can additionally or alternatively be supplied by the user. For example, the user can input latitude and longitude information or postal zip code to define the geographic location associated with the image.

The map location associated with a capture record can be represented as a probability distribution rather than a single point. Even the most accurate location determination system described above (GPS) is susceptible to errors of at least several meters. The geographic location can be represented as a point and an associated uncertainty, or as a probability distribution. For example, when the geographic location is a postal zip code, a uniform probability distribution over the region defined by the zip code can be used.

If more than one item of location information is available for a particular capture record, then the best of the items or a combination of map locations determined from the items can be used based upon a set of predetermined rules. For example, a rule could be provided that user input supersedes location information identifying a cell site and that GPS data transmissions supersede user input. Suitable rules can be determined heuristically.

Location information can be provided as items of metadata associated with individual capture records. The map locations can represent or be derived from metadata, that is, non-image information that is associated with individual images in some manner that permits transfer of the information along with the images. For example, metadata is sometimes provided within the same file as image information. The inclusion of metadata with digital files either as associated separate files or within the structure of a single file, is well known to those of skill in the art. For example, EXIF files defined by the Japan Electronics and Information Technology Industries Association Standard: JEITA CP-3451, *Exchangeable image file format fordigital still cameras: Exif Version* 2.2, Established April 2002, provide for metadata within a file that also includes a digital image.

Supplemental metadata, in addition to location information can also be provided and, if desired, can be used in clustering. For example, date-time information can be provided as supplemental metadata. The date-time information can be relative to an "absolute" standard or can be relative to some other reference. For example, one or several cameras can be synchronized to an arbitrary reference time. In the same manner, times can be measured in differences from a particular reference time or closest of a sequence of reference times. Other examples of supplemental metadata that can be used in clustering are: flash fired state, focus distance, lens focal length, selected/not selected as favorite, illuminant type, camera type, camera serial number, and user name.

In particular embodiments, a sequence of capture records is captured using a capture device. The capture device also receives data transmissions. Each of the data transmissions provides location information that defines a map location on a predetermined overall map. Map locations of ones of the data transmissions that are concurrent with capture records are recorded as metadata in association with the respective capture records. The term "concurrent" refers to either simultaneity with a particular record capture or to sufficient closeness in time as to preclude relocation during the intervening interval. In some of these embodiments, what is received is a stream of periodic data transmissions. For example, such a stream is provided by the Global Positioning System, which defines a map location in geopositioning coordinates relative to an overall map of the Earth.

It is preferred that every capture record is associated with a map location determined for that particular capture record. Such information may not be available. In that case, the best available data can be used. This degrades the accuracy and precision of clustering. On the other hand, in many uses, such as classification of ordinary consumer images, the degradation can be entirely acceptable. This relates to the fact that the classification is not critical to later use of such images, since user intervention can be interposed to allow correction of any misclassifications. This is particularly the case if the best available data is likely to be close to actual map locations and/or the number of capture records involved is a relatively low percentage of the total number.

The best available location data can be the last determined location or can be interpolated from before and after determined locations. Acceptable approaches for particular situations can be determined heuristically.

Figure 2:
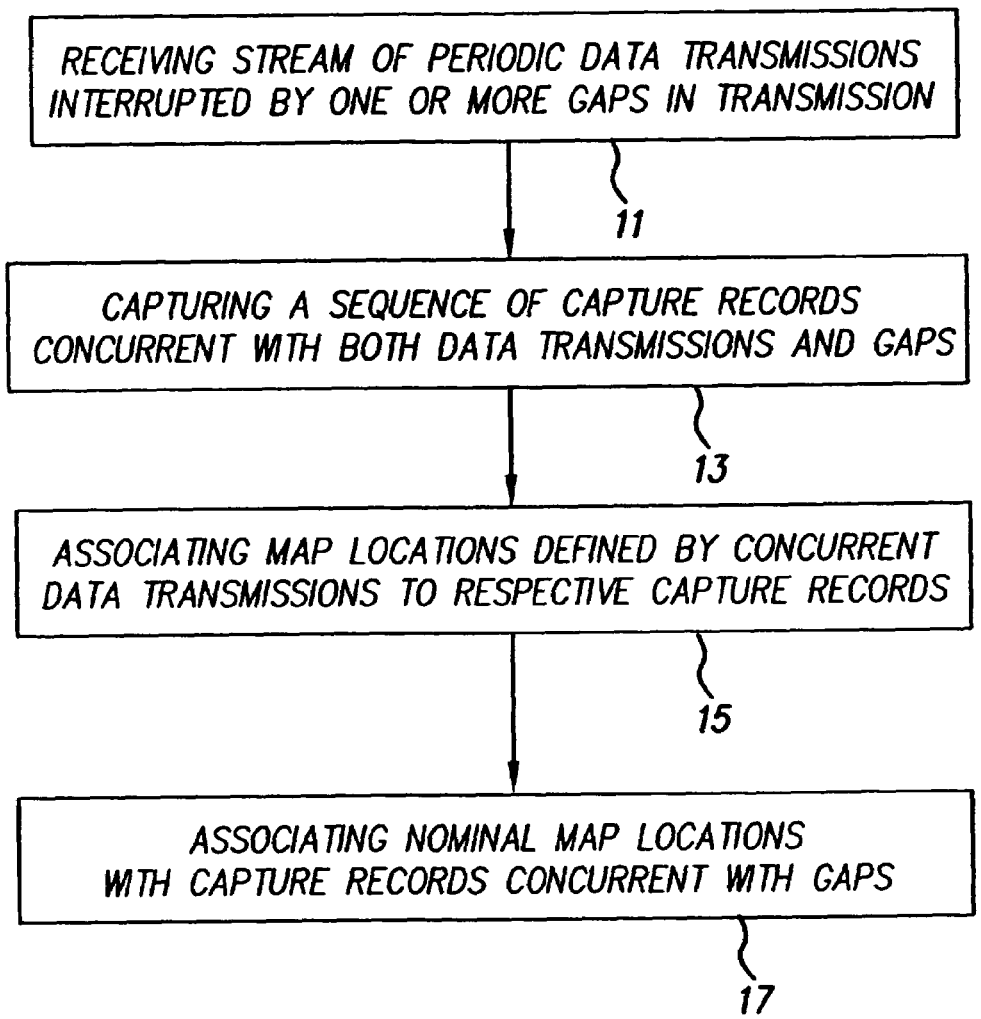
FIG. 2 is a detailed flow chart of the providing step in a modification of the method of FIG. 1.

Referring to FIGS. 1-2, in a particular embodiment, data transmissions are received (11) in a stream interrupted by periodic gaps. A sequence of captured records are captured (13). Capture records concurrent with data transmissions (also referred to herein as "located capture records") are associated (15) with map locations defined by the respective concurrent data transmissions. Captured records that are concurrent with gaps in transmission (also referred to here as "non-located captured records") are associated (17) with nominal map locations that represent best available data. It is preferred that the nominal map locations are within an area delimited by capture locations of the nearest capture records concurrent with data transmissions.

The term "clustering" as used herein refers to a pattern classification procedure. In the methods described in detail herein, clustering is used to provide a logical organizing of capture records, rather than a physical organization of digital files or hard copy capture records or the like. It will be understood that logical and/or physical clustering of capture records can be undertaken based upon the classification provided by the clustering.

The collection of captured records is clustered (20) by location, and optionally by both location and date-time. Clustering by location and date-time groups by event, an organization category delimited in both time and space, that attempts to mimic an organization approach of human memory. Location information can be two dimensional or can have a higher dimensionality. For example, altitude information can be included and time can be included as another dimension or can be treated separately.

Clustering can ignore differences in the sizes of different areas defined by map locations by treating all areas as points or can accommodate differences in the different areas. For example, each location can be treated as a uniform probability distribution that is proportional to the respective area. Tolerances can be handled in a similar manner, if desired. Suitability of a particular approach can be determined heuristically.

In some image clustering procedures, images are classified into groups and optionally into subgroups, and then into smaller divisions referred to as subsets. (Specific terms used are arbitrary.) The methods and systems here are applicable to such groups, subgroups, and subsets; however, for convenience, clustering is generally described here only in relation to "groups". Like considerations apply to smaller divisions.

A variety of different types of clustering procedures can be used, such as those disclosed in: *Pattern Recognition Engineering*, by M. Nadler and E. Smith, John Wiley & Sons, Inc., 1993, pp. 294-328. The criteria for choosing an appropriate clustering procedure is determined empirically by one skilled in the art of pattern recognition.

Figure 4:
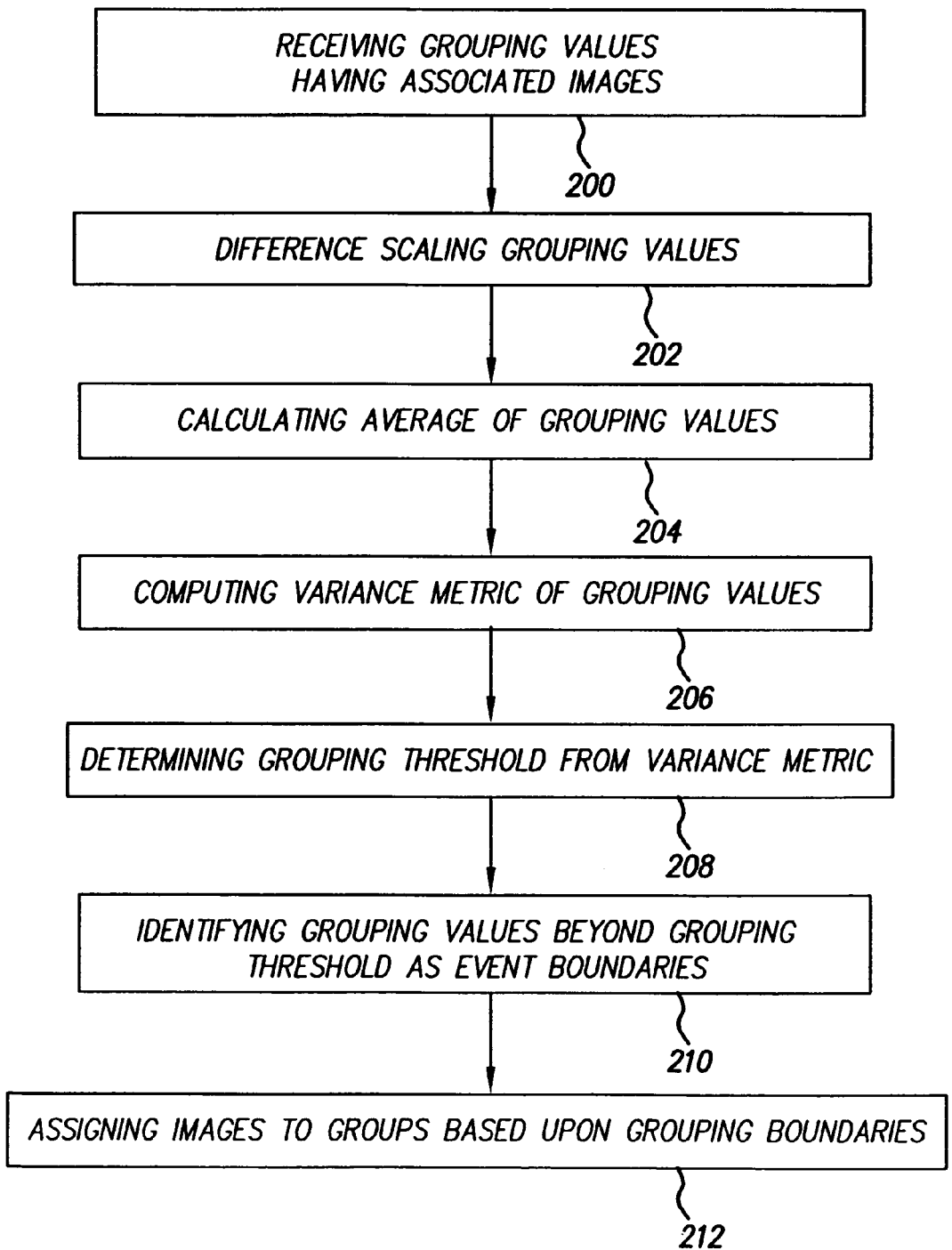
FIG. 4 is a flow chart of one alternative of the clustering step of the method of FIG. 1.

A currently preferred clustering procedure is disclosed in U.S. patent application Ser. No. 10/997,411, "Variance-based Event Clustering", filed by A. Loui and B. Kraus, on Nov. 17, 2004, which is hereby incorporated herein by reference. Referring to FIG. 4, in this clustering method, a set of map locations associated with individual capture records is received (200) and averaged (204). The averaging, in the embodiments disclosed herein, provides an arithmetic mean. Other "averages", such as median and mode, can be used as appropriate for a particular variance metric and a particular use. A variance metric relative to the average is computed (206) and a grouping threshold is determined (208). Map locations beyond the threshold are identified (210) as grouping boundaries and capture records are assigned (212) to groups based upon the grouping boundaries.

The map locations can be scaled (202) with a scaling function prior to averaging. In particular embodiments, the scaling function is a continuous mathematical function that is invertible and has a positive, decreasing slope. As a result, the scaling function maintains small map location differences and compresses large map location differences. A scaling function for a particular use can be determined heuristically.

The map locations can be arranged in a histogram, which is modified, using the scaling function, to provide a scaled histogram. The histogram can be used to provide a visual check of the groups provided by the method.

A variance metric is computed from the map locations in accordance with ordinary statistical procedures. The variance metric is a statistical parameter related to the variance of a set of values relative to a particular average. Examples of suitable variance metrics include: standard deviation, variance, mean deviation, and sample variation.

A grouping threshold is set relative to the variance metric. For example, when the variance metric is the standard deviation, the grouping threshold is a multiple of standard deviation. A suitable grouping threshold for a particular use can be determined heuristically using an exemplary set of images.

After the grouping threshold is determined, map locations beyond the event threshold are identified as grouping boundaries and capture records are assigned to groups based upon those grouping boundaries. For example, in a particular embodiment, any difference in map locations that diverges from a set average by more than a preselected number of standard deviations is considered a grouping boundary and images are grouped in accordance with those boundaries. Additional grouping boundaries can be provided by additional grouping thresholds that are larger multiples of the original grouping threshold. For example, an initial grouping threshold t can be used with additional grouping thresholds at kt, 2 kt . . . nkt standard deviations.

In performing the method, the scaled histogram can be checked to confirm that the selected scaling function has not obscured map location differences that lie below the grouping threshold and has compressed the differences between the map locations that lie beyond the grouping threshold, and, thus, the selected scaling function is appropriate for the map locations of a particular image set.

As an alternative to the grouping procedure described above, any clustering algorithm can be used to cluster the images based on the associated geographic locations (and optionally the associated capture times as well). Clustering finds groups of images by computing distances between geographic locations. For example, the well known clustering algorithm isodata can be used to cluster the images into groups. This algorithm clusters data by first assuming a number of cluster centers, then assigning each data point (the geographic location associated with an image) to the nearest cluster center. Features used in addition to map locations may need to be scaled. For example, when geographic location and capture time in seconds are considered, the capture time may need to be scaled so the numerical range of the data is roughly proportional to its importance as a feature for clustering versus the geographic information. Then new cluster centers are computed by finding the mean of all the data points assigned to a particular cluster. This process is repeated until the cluster centers remain unchanged (or a minimum number of images change assignments, for example).

Figure 10:
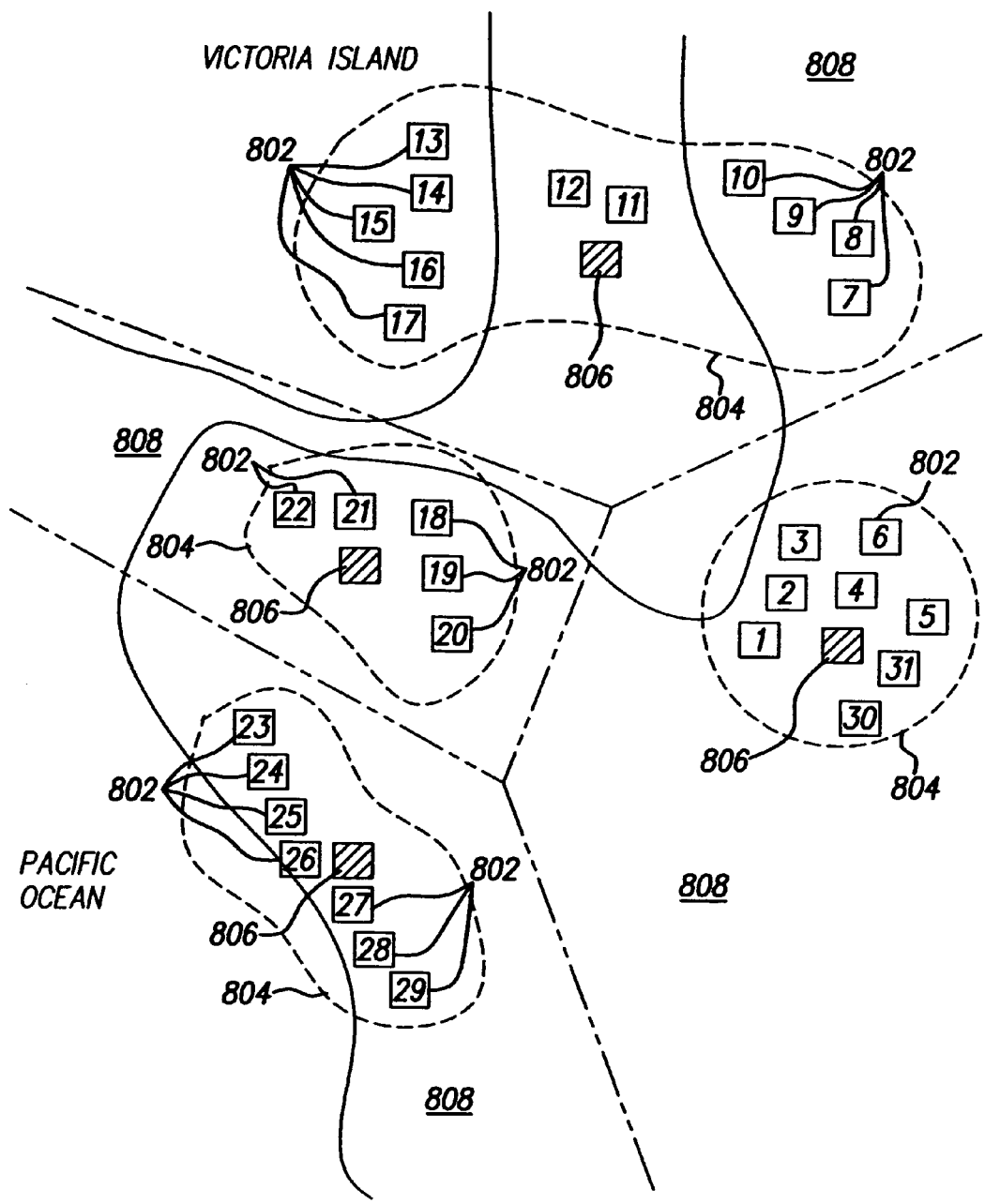
FIG. 10 shows a map segmented in accordance with the method of FIG. 1. Regions are separated by dash-dot lines. Clusters associated with each region are indicated by dashed lines. Core locations are indicated by solid squares.

FIG. 10 shows an example of geographic locations 802 associated with images clustered by a clustering algorithm. The resulting four groups of images (i.e. clusters) are shown circled by a dashed outlines 804. The number of clusters can be dynamically modified by merging clusters that are close in distance or increased by splitting clusters covering a large area. For the purposes of clustering, the geographic distance between geographic coordinates must be computed. A spherical model of the earth can be used for this purpose, or a more precise but complex ellipsoidal model using the Vicenty Formula can be used. The mean of a set of geographic coordinates is computed by determining the Cartesian (x, y, z) position of each location, then computing the mean of the set of (x, y, z) coordinate vectors, then ensuring that the result has the proper magnitude (i.e. radius for the earth) for that location by scaling by a constant if necessary. Other clustering algorithms, such as clustering by growing a minimal spanning tree, can be used as well.

To further improve the performance of the grouping, geographic features can be considered. For example, consider the geographic locations 802 associated with images shown in the map of FIG. 11. A natural choice for a grouping would be to group the images captured in the river separately from those captured on the shore. However, clustering based on geographic location along will not achieve this desired result. Therefore, considering geographic features related to the geographic locations associated with the images leads to improved clustering results. In a similar manner, the geographic regions can be improved by considering geographic features as well. Geographic features can include rivers, lakes, terrain type (mountain, valley, ridge, plain), political boundaries or political affiliation (country, state, county, province, property line boundaries, zip code boundary), and the like. Geographic features can be considered during a clustering algorithm by, for example, determining a value for each geographic feature for a cluster center by determining the most frequently occurring value for the geographic feature for images belonging to that cluster center. Then, when a distance between an image's associated geographic location and a cluster center is computed, a penalty is added if the cluster center's value for the geographic feature does not match the image's value for the geographic feature.

Figure 8:
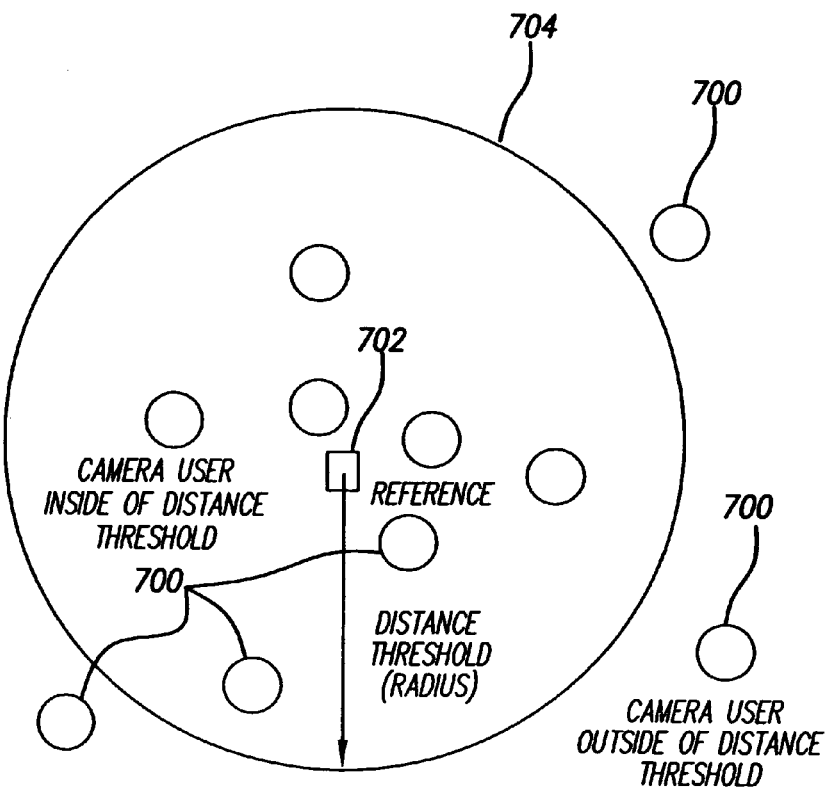
FIG. 8 is a diagram of clustering by distance of a set of images by the procedure of FIG. 4.

Referring now to FIG. 8, in a particular embodiment, capture records are grouped by distance of an independently operated camera 700 from a reference 702 at the time of image capture. After the map locations associated with the images are received (200), a map location difference histogram is prepared, and the map location difference histogram is mapped (202) using a map location difference scaling function, to provide a scaled histogram. The average is calculated (204) and standard deviation of the set of scaled map location differences is computed (206), and the grouping threshold is determined (208). The determined grouping threshold is circle 704. Capture records associated with map location differences within the event threshold are assigned (212) to groups bounded by the grouping boundaries.

For example, this embodiment of the method can be used to delimit group boundaries for a set of images captured by different photographers using a plurality of cell phones cameras or other mobile capture devices capable of recording GPS coordinates as image metadata. The GPS coordinates are reduced to distances from a reference location or user. The images are grouped based upon the individual photographer's roaming relative to a central location or reference user.

Figure 9:
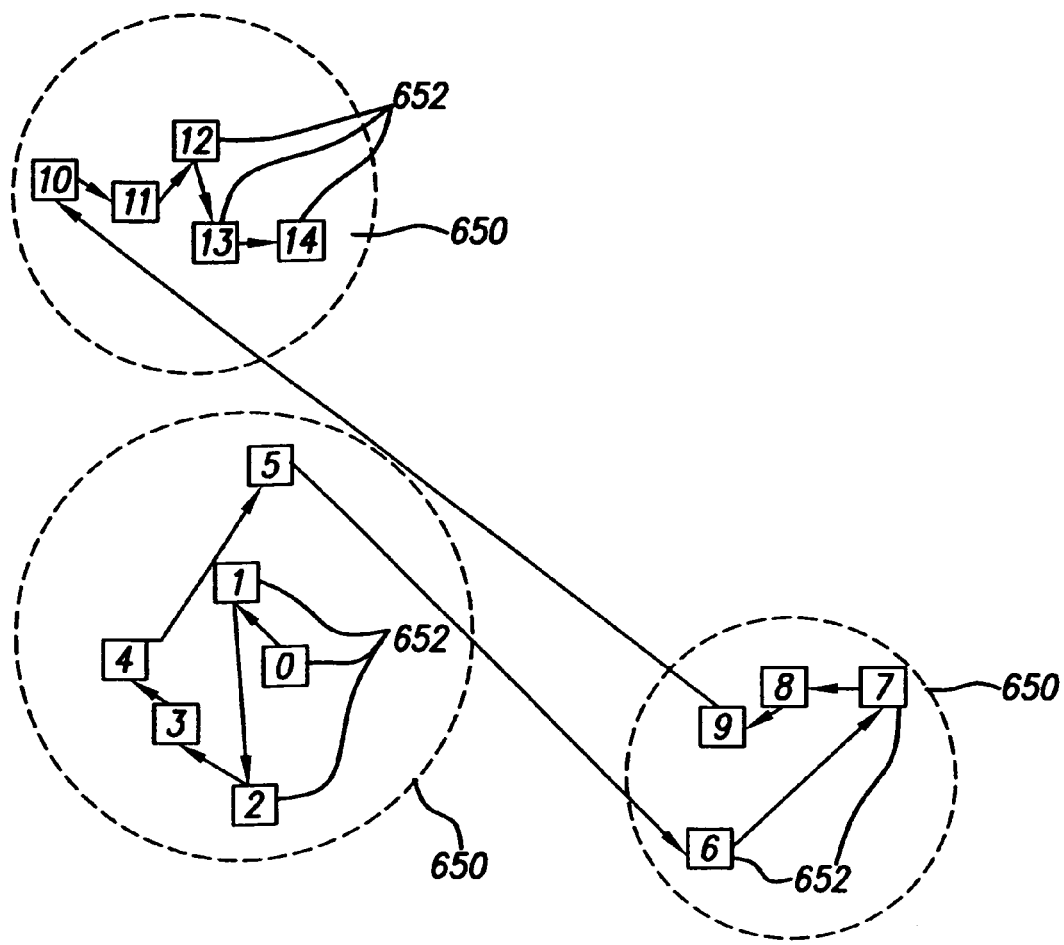
FIG. 9 is a diagram of clustering by distance and time of another set of images by the procedure of FIG. 4.

Referring now to FIG. 9, the method is applicable to a problem domain, in which map locations include chronological information and geographic information. In this case, the map locations are distances (indicated by arrows in FIG. 9) between successive images in time sequence of image capture. Groups are defined by distance boundaries 650 about groups of images 652. The scaled histogram and other procedures are like those earlier discussed. Table 1 is an example of map locations for a time sequence of images. The left column represents the order of the images captured, and the right column represents the distance between an image i and image i+1.

TABLE 1

| Image number | distance (meters) |
|---|---|
| 0 | 10 |
| 1 | 42 |
| 2 | 19 |
| 3 | 6 |
| 4 | 79 |
| 5 | 693 |
| 6 | 21 |
| 7 | 5 |
| 8 | 9 |
| 9 | 1314 |
| 10 | 3 |
| 11 | 10 |
| 12 | 18 |
| 13 | 12 |

The images are divided into groups between the 5th and 6th and 9th and 10th images. FIG. 9 illustrates this in a graphical manner. In this embodiment, an additional grouping threshold would defines subgroups within groups defined by the grouping threshold.

Additional capture record differences can be used in the clustering. For example, differences used can be a global or block-based measure of image content, such as image contrast, dynamic range, and color characteristics. The block histogram differences are conveniently provided as the remainder after subtracting a block histogram similarity from unity (or another value associated with identity). Block histogram similarity can be determined in ways known to those of skill in the art, such as the procedure described in U.S. Pat. No. 6,351,556, which is hereby incorporated herein by reference.

Figure 5:
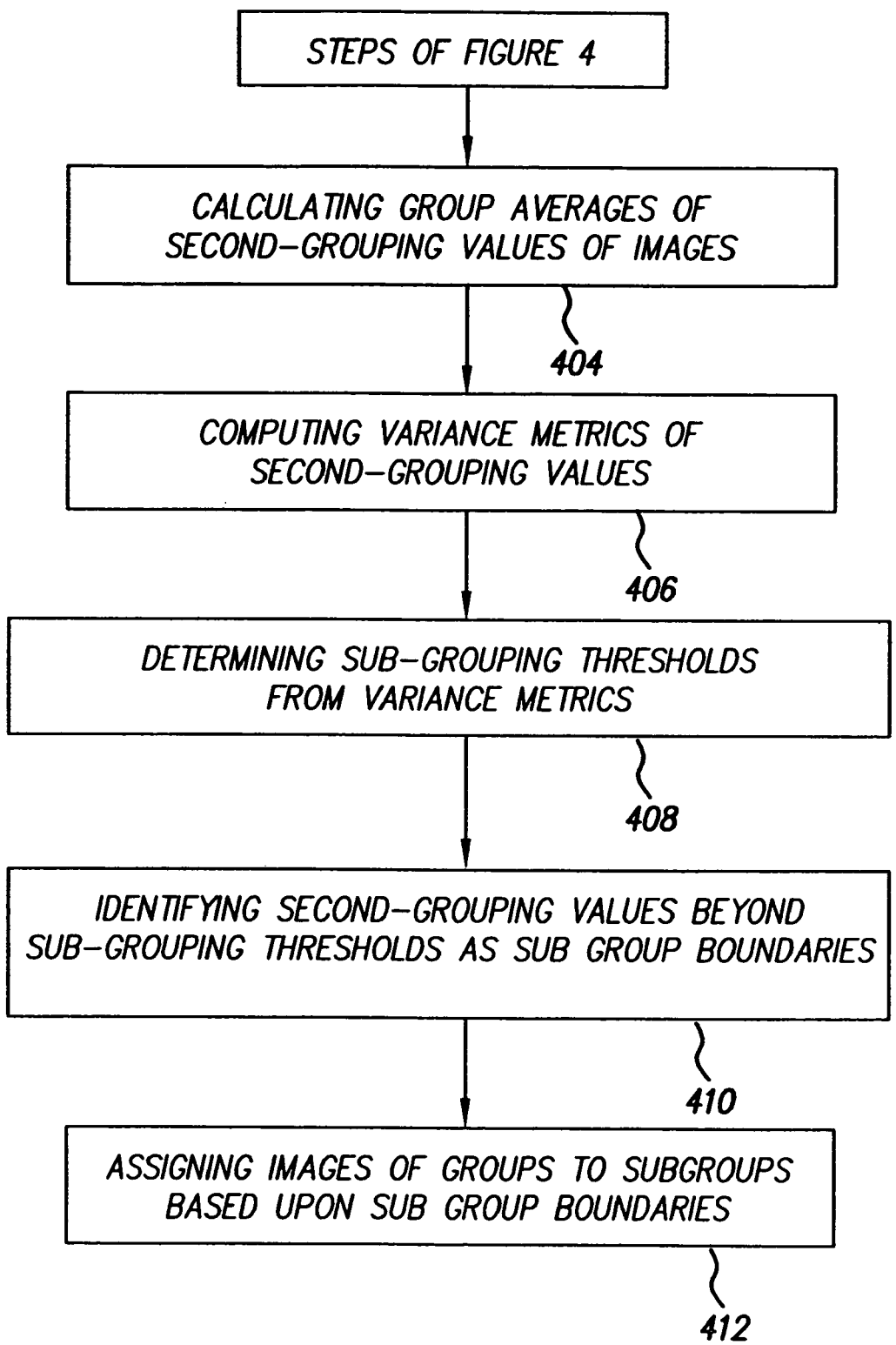
FIG. 5 is a flow chart of optional procedures usable with the clustering of FIG. 4.
Figure 6:
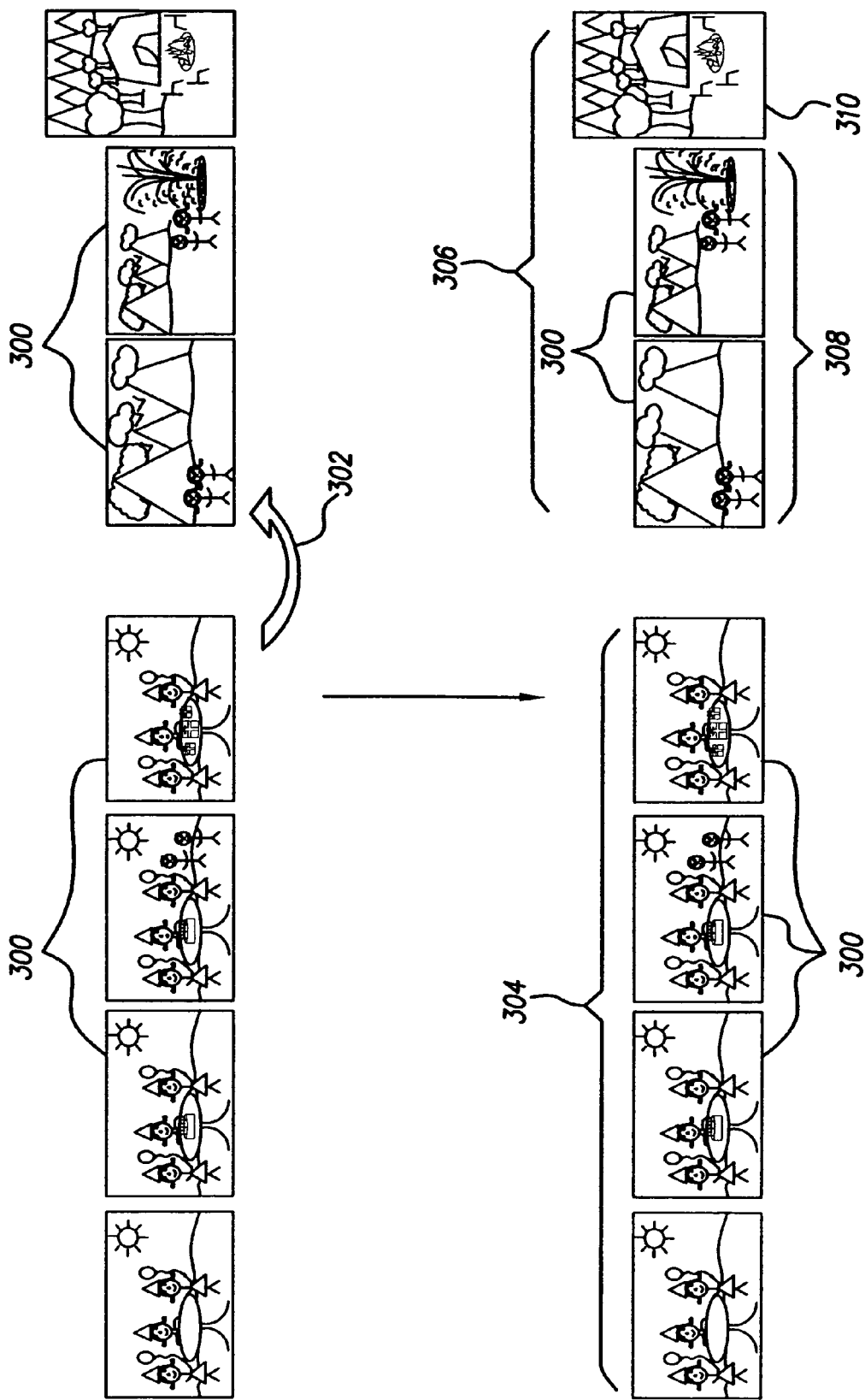
FIG. 6 is a diagram of classification of images into groups and sub-groups using the procedures of FIGS. 4-5.
Figure 7:
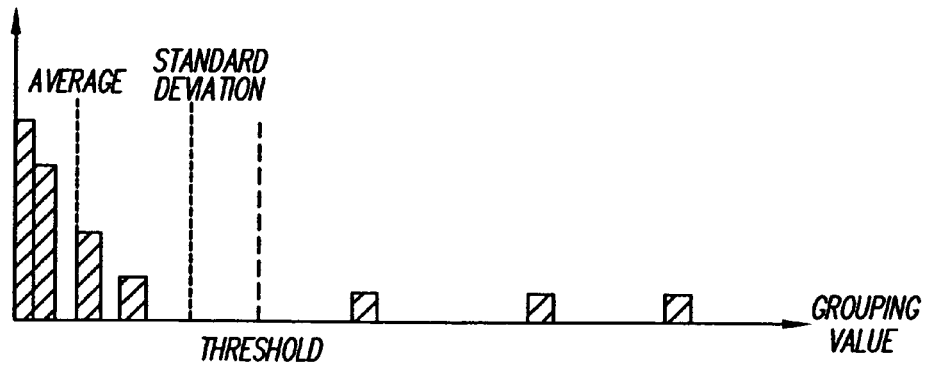
FIG. 7 is a diagram showing a scaled histogram of the clustering of FIG. 4. Imposed on the histogram are the mean average, standard deviation, and grouping threshold.

Referring to FIGS. 4 and 5, the method of the invention can be used iteratively to provide subgroupings within previously determined groups or subgroups. Calculating (404), computing (406), determining (408), identifying (410), and assigning (412) steps in FIG. 5 correspond to steps in FIG. 4 having reference numbers differing by 200. FIG. 6 illustrates a grouping of a set of images 300 at an grouping threshold 302 into two groups 304,306, followed by subgrouping of one group 306 into two sub-groups 308,310.

The methods and systems can also be used with other grouping methods particularly grouping methods that use information other than that previously used. For example, the method can be used to detect events of a collection of images using time difference clustering preceded or followed by an alternative clustering method using another method such as block histogram clustering or two-means clustering (disclosed in U.S. Pat. No. 6,606,411 and U.S. Pat. No. 6,351,556, which are both hereby incorporated herein by reference). Block histogram clustering is an example of a clustering technique, in which the content of images is analyzed and images are assigned to subsets (groups or subgroups) responsive to that analyzing. Block histogram intersection values are determined for pairs of images. Block-based histogram correlations are performed when histogram intersection values exceed a predetermined difference threshold.

Following clustering, a map is segmented (40). The map includes the capture locations and, preferably, extends beyond the capture locations so as to include all map locations likely to later be of interest in utilization of the segmented map. The map is then segmented into regions corresponding to each of the groups.

A variety of different segmenting approaches can be used. In some cases, it is necessary to first determine (30) a core location of each of the groups, prior to partitioning (35) the map into regions. A core location represents a group for measurement purposes during segmentation of the map. A convenient core location is the centroid of the group. Alternative core locations include: the area of one of the capture locations, such as the capture location nearest the centroid; an area formed by a combination of two or more of the capture locations, such as a combination of all of the capture locations in the group. The type of core location used with a particular collection of capture records can be determined heuristically.

A useful by-product of the isodata clustering algorithm is that not only are images classified into groups, but also each cluster center can be used as a core location in segmenting a geographic map. The geographic region associated with a group of images contains the geographic locations of all images belonging to the group of images. The regions are the well-known Voronoi cell defining regions have all points closer to the cluster center (that is, core location) than any other cluster center. The geographic region is then associated with the group of images belonging to that cluster center. For example, FIG. 10 shows the four cluster centers 806 associated with each group as well as the four geographic regions 808 defined by the dot-dash lines associated with each group. Preferably, the geographic regions associated with a group are non-overlapping regions. However, it is possible that the regions will overlap, especially in situations where a single location is visited twice with some elapsed time between the visits.

Alternative procedures for segmenting the map include forming regions such that for each group of images, the associated region includes all points closer to any of the capture locations associated with group images than to any capture location associated with any other group of images. The map can also be segmented by forming regions by finding the convex hull of the capture locations associated with each group of images. This segmentation ensures that the each region includes all of the capture locations associated with the associated group of images. Further, the map can also be segmented by forming triangles between each set of three capture locations in a group, then selecting the set of triangles that have the smallest total area subject to the constraint that each capture location is a vertex of at least one of the triangles of the set. The region is then the union of all the triangles in the selected set of triangles.

In each case, the map segmentation is a function of the capture positions associated with the groups of images. Furthermore, the map segmentation is a function of the relative positions of the capture positions. This is because the map segmentation occurs as a result of determining distances between capture positions.

After the map is segmented, the regions of the map are associated (50) with the capture records of the respective groups. This association can be physical or logical or both. Information necessary to generate the segmented map or respective map segments can be maintained with each of the capture records or with the groups of capture records or with the collection. Alternatively, the capture records can be maintained as a part of the map or respective segments.

The capture records associated with a map segment can all be given a common annotation based upon information associated with the map segment. The annotation can be displayed to a user and the user can be allowed to alter the annotation, if desired. For example, a map segment could include an area having the associated place name "Rocky Mountains", including the States of Wyoming and Montana. A group of images having capture locations in Montana and Wyoming could be given the annotation "Rocky Mountains" and the resulting annotations images could be displayed to the user.

The segmented map is available when the capture records are utilized and can be used to provide access to the capture records. For example, the segmented map can be displayed to a user as an interface to the image collection. The user can obtain access to selected images by querying, either by typing in a place name or by otherwise designating a segment of the map. The opposite can also be provided. Images and other capture records can be presented to the user in a virtual album format or individually and information regarding the associated map segments can be presented when the user requests by mouse clicking on an appropriate icon or the like. Map directions can similarly be provided between two map segments associated with different capture records.

Other utilization of the segmented map and grouped images includes determination of the scale to display a map. A user selects images from one or more groups of images, and the map scale for display is determined such that the regions associated with the image groups are in full view in the displayed map. In addition, the user can label or tag the regions to aid in search and retrieval of the capture records.

Figure 12:
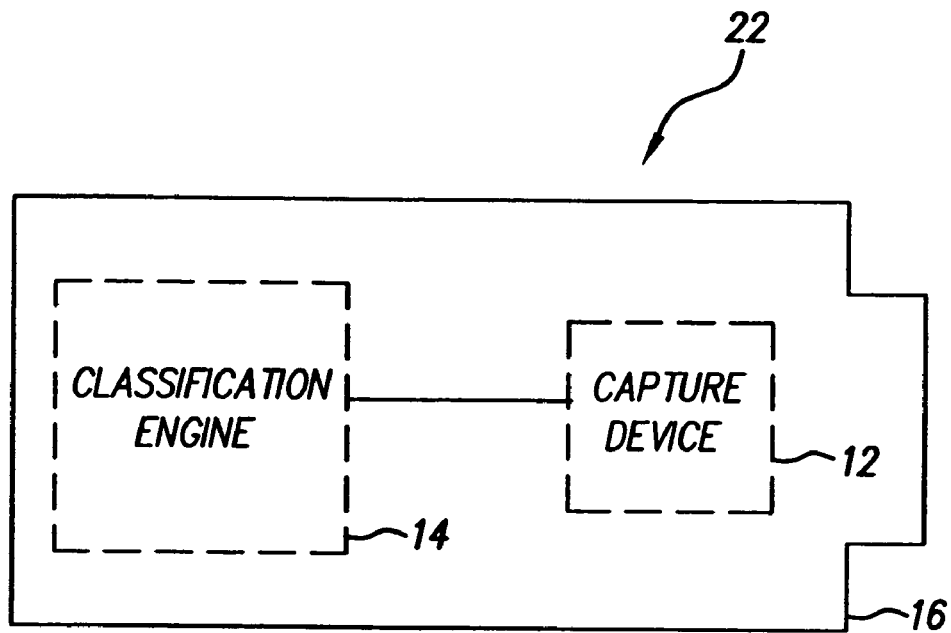
FIG. 12 is a diagram of another embodiment of the system.
Figure 13:
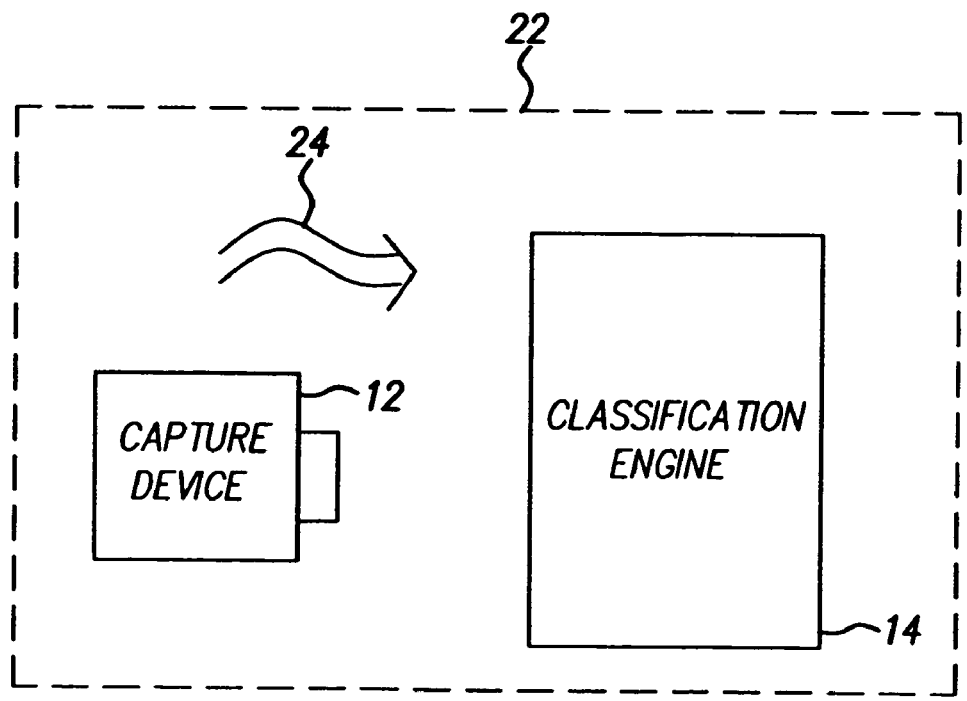
FIG. 13 is a diagram of yet another embodiment of the system.

The systems of the invention provide one or more separate components that can be used to practice the methods. Referring to FIG. 12, some embodiments of the system 22 include both a capture device 12 and a classification engine 14, which can be provided within the body 16 of a camera or other assemblage. Communication between components 12,14 is via a direct communication path 18. Referring to FIG. 13, in other embodiments, the capture devices 12 are separate from the classification engine 14 and communication is via a wire or wireless communication device and can be through one or more networks (illustrated by wavy arrow 24). In this case, the capture devices can be cameras lacking classification engines and the classification engine can be a separate dedicated device or a logical function of a programmed general-purpose computer or microprocessor.

Figure 14:
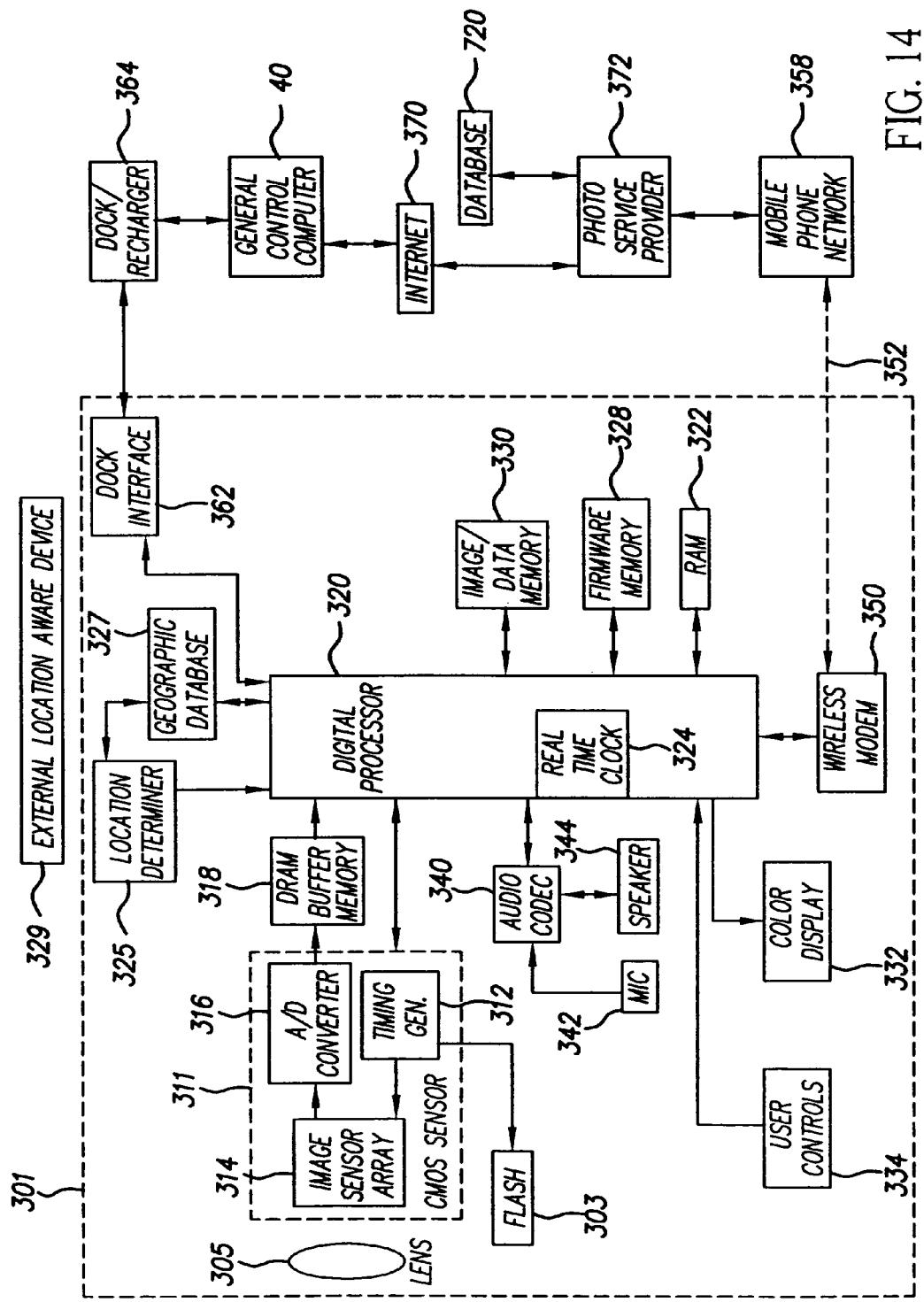
FIG. 14 is a diagram of still another embodiment of the system.

FIG. 14 is a block diagram of a particular embodiment of the system. The camera phone 301 is a portable battery operated device, small enough to be easily handheld by a user when capturing and reviewing images. The digital camera phone 301 produces digital images that are stored using the image data/memory 330, which can be, for example, internal Flash EPROM memory, or a removable memory card. Other types of digital image storage media, such as magnetic hard drives, magnetic tape, or optical disks, can alternatively be used to provide the image/data memory 330.

The digital camera phone 301 includes a lens 305, which focuses light from a scene (not shown) onto an image sensor array 314 of a CMOS image sensor 311. The image sensor array 314 can provide color image information using the well-known Bayer color filter pattern. The image sensor array 314 is controlled by timing generator 312, which also controls a flash 303 in order to illuminate the scene when the ambient illumination is low. The image sensor array 314 can have, for example, 1280 columns×960 rows of pixels.

In some embodiments, the digital camera phone 301 can also store video clips, by summing multiple pixels of the image sensor array 314 together (e.g. summing pixels of the same color within each 4 column×4 row area of the image sensor array 314) to create a lower resolution video image frame. The video image frames are read from the image sensor array 314 at regular intervals, for example using a 24 frame per second readout rate.

The analog output signals from the image sensor array 314 are amplified and converted to digital data by the analog-to-digital (A/D) converter circuit 316 on the CMOS image sensor 311. The digital data is stored in a DRAM buffer memory 318 and subsequently processed by a digital processor 320 controlled by the firmware stored in firmware memory 328, which can be flash EPROM memory. The digital processor 320 includes a real-time clock 324, which keeps the date and time even when the digital camera phone 301 and digital processor 320 are in their low power state.

The processed digital image files are stored in the image/data memory 330. The image/data memory 330 can also be used to store the user's personal calendar information, as will be described later in reference to FIG. 11. The image/data memory can also store other types of data, such as phone numbers, to-do lists, and the like.

In the still image mode, the digital processor 320 performs color interpolation followed by color and tone correction, in order to produce rendered sRGB image data. The digital processor 320 can also provide various image sizes selected by the user. The rendered sRGB image data is then JPEG compressed and stored as a JPEG image file in the image/data memory 330. The JPEG file uses the so-called "Exif" image format mentioned earlier. This format includes an Exif application segment that stores particular image metadata using various TIFF tags. Separate TIFF tags can be used, for example, to store the date and time the picture was captured, the lens f/number and other camera settings, and to store image captions. In particular, the ImageDescription tag can be used to store labels, as will be described later. The real-time clock 324 provides a capture date/time value, which is stored as date/time metadata in each Exif image file.

In this embodiment, the camera includes a location determiner 325. This location determiner includes a location information receiver that receives location information, such as data transmissions, and a converter that converts the location information to map locations. The map locations are then stored in association with the images. The map location is preferably stored as coordinates that are directly readable on the map that will be used; for example, a geographic map location is generally conveniently stored in units of latitude and longitude. The converter can include a conversion database 327 that relates location information to specific map locations. The conversion database can be located on the camera itself or external to the camera, with remote access via a dock interface 362 or wireless modem 350, or the like. The location determiner can additionally or alternatively include a user interface, such as a microphone or keyboard, that allows the user to input map locations or location information.

In other embodiments, the camera or other capture device has a location information receiver that receives and stores location information in association with captured images. In that embodiment, map locations are determined later in a converter that is a separate system component or part of the component that includes the classification engine. For example, the map locations can be determined when an image and location information metadata is transmitted to a photo service provider, such as KODAK EASYSHARE Gallery, which is provided by Eastman Kodak Company of Rochester, N.Y. online at the URL: www.kodakgallery.com.

As an alternative, the location information receiver can be an external location aware device that is separate from the camera. In that case, map locations are determined by the location aware device and are then transmitted to the camera via the dock interface 362 or the wireless modem 350 or the like. A location aware device 329 is a device that knows its location by means of a location information receiver, such as a GPS receiver built into an automobile, or is a stationary object that knows its position, such as a radio-frequency beacon. The location determiner 325 can either poll the external location aware device 329 for its location, or the location determiner 325 can poll the external location aware device 329 for its location at a specific time (for example, the specific time is an image capture time). This alternative is effective when the location aware device 329 is in close proximity to the camera phone 301, as for example when the location aware device 329 is a GPS receiver in an automobile.

In particular embodiments, the location determiner 325 estimates a map location of a capture record that would otherwise lack map locations. For example, GPS receivers often fail to detect signal when indoors. A location determiner that includes such a receiver 325 can use nearest in time available location information or an interpolation between multiple geographic positions at times before and/or after the image capture time. As an option, the digital processor can continuously store the geographic location determined by the location determiner 325, rather than storing only in temporal relation to image capture. This approach provides data for estimating locations when data transmissions are unavailable and has the added benefit of allowing the camera to display not only the locations of captured images, but also the path taken by the user between image captures.

The digital processor 320 can create a low-resolution "thumbnail" size image, which can be created as described in commonly-assigned U.S. Pat. No. 5,164,831, entitled "Electronic Still Camera Providing Multi-Format Storage Of Full And Reduced Resolution Images" to Kuchta, et al. The thumbnail image can be stored in RAM memory 322 and supplied to a color display 332, which can be, for example, an active matrix LCD or organic light emitting diode (OLED). After images are captured, they can be quickly reviewed on the color LCD image display 332 by using the thumbnail image data.

The graphical user interface displayed on the color display 332 is controlled by a user interface that includes user controls 334. The user controls 334 can include dedicated push buttons (e.g. a telephone keypad) to dial a phone number, a control to set the mode (e.g. "phone" mode, "camera" mode), a joystick controller that includes 4-way control (up, down, left, right) and a push-button center "OK" switch, or the like.

An audio codec 340 connected to the digital processor 320 receives an audio signal from a microphone 342 and provides an audio signal to a speaker 344. These components can be used both for telephone conversations and to record and playback an audio track, along with a video sequence or still image. The speaker 344 can also be used to inform the user of an incoming phone call. This can be done using a standard ring tone stored in firmware memory 328, or by using a custom ring-tone downloaded from the mobile phone network 358 and stored in the image/data memory 330. In addition, a vibration device (not shown) can be used to provide a silent (e.g. non audible) notification of an incoming phone call.

A dock interface 362 can be used to connect the digital camera phone 301 to a dock/charger 364, which is connected to the general control computer 40. The dock interface 362 may conform to, for example, the well-known USB (Universal Serial Bus) interface specification. Alternatively, the interface between the digital camera 301 and the image capture device 10 can be a wireless interface, such as the well-known Bluetooth wireless interface or the well-know 802.11b wireless interface. The dock interface 362 can be used to download images from the image/data memory 330 to the general control computer 40. The dock interface 362 can also be used to transfer calendar information from the general control computer 40 to the image/data memory in the digital camera phone 301. The dock/charger 364 can also be used to recharge the batteries (not shown) in the digital camera phone 301.

The digital processor 320 is coupled to a wireless modem 350, which enables the digital camera phone 301 to transmit and receive information via an RF (radio frequency) channel 352. The wireless modem 350 communicates over a radio frequency (e.g. wireless) link with a mobile phone network 358, such as a 3GSM network. The mobile phone network 358 communicates with a photo service provider 372, which can store digital images uploaded from the digital camera phone 301. These images can be accessed via the Internet 370 by other devices, including the general control computer 40. The mobile phone network 358 also connects to a standard telephone network (not shown) in order to provide normal telephone service.

Figure 15:
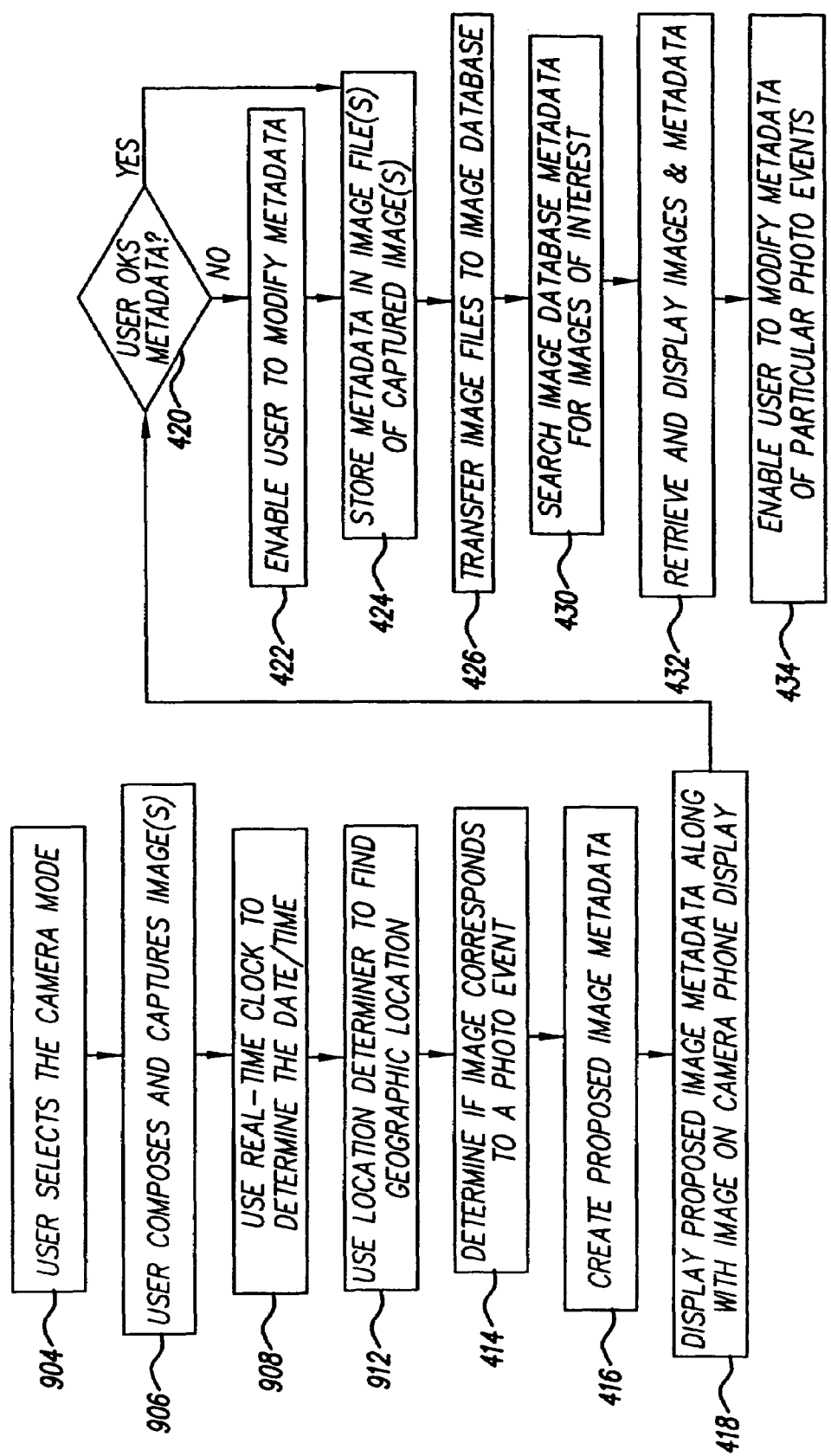
FIG. 15 is a flow chart of another embodiment of the method, which incorporates the steps of FIG. 1.

FIG. 15 is a flow chart of a particular embodiment of the present invention. This embodiment can use the digital camera phone 301 based imaging system described earlier in reference to FIG. 14 and incorporates the method of FIG. 1.

The digital camera phone 301 includes user controls 334 that enable the user to select various operating modes. In the "phone" mode, the digital camera phone 330 operates as a standard mobile phone. In a "camera" mode, the digital camera phone 301 operates as a still or video camera, in order to capture, display, and transfer images.

In block 904, the user selects the camera mode. In block 906, the user composes the image(s) to be captured, using the color display 332 as a viewfinder, and presses one of the user controls 334 (e.g. a shutter button, not shown) to capture the image(s). The image signals provided by the image sensor array 314 are converted to digital signals by A/D converter circuit 316 and stored in DRAM buffer memory 318. Note that similarly block 904 encompasses capturing a video clip (i.e. a sequence of images and associated audio recorded from the microphone 342), or just a sound clip (i.e. audio recorded from the microphone 342).

In block 908, the digital processor 320 reads the value of the real time clock 324 after each image is captured, to determine the date and time the picture was taken. In block 912, the digital processor 320 retrieves the map location associated with the image from the location determiner 325. In block 414, the digital processor 320 determines if the image corresponds to a group, as described above.

The classification engine of the camera phone 301 can receive capture records via the dock interface 362, the mobile phone network 358, or the wireless modem 350 from friends, family, or associates. These capture records may have associated geographic location information already that can be used to group the capture records according to block 414. When no map location or location information for a capture record is available, the location determiner 325 determined the location of the camera phone 301 at the time the capture record was received. This location can then be used to group the capture records according to block 414. It has been determined that, although the map locations based upon image receipt rather than capture are inaccurate, those map locations are not arbitrary and provide a useful indicator to the user. The received images are associated with the location of receipt, which can remind the user of how the images came to be received and other relevance of the images. The same approach can be applied to other embodiments, in which the classification engine is a separate component and does not move with the capture device, but this may not be as desirable, if too many images are likely to be grouped with a single location, such as the user's home.

Referring again to FIG. 12, in block 416, the digital processor 320 uses the location information to create proposed image annotations. For example, if the location information is "43.18867 degrees N, 77.873711 degrees W", the proposed image annotation could be "Location Coordinates: 43.18867, -77.873711, Place Name: Sweden, N.Y.". The image annotation can be found via a search of the geographic database 327, or by searching through the map locations associated with other images or groups of images in memory for the annotations of images having associated geographic locations sufficiently close to the location information for the current image or group of images.

In block 418, the proposed image annotation is displayed on the color display 332 along with the image(s) captured in block 406. This enables the user to see the proposed image annotation, and check whether it is an appropriate label for the captured image(s). In addition to displaying the proposed image annotation, the processor 320 displays a request for the user to approve the proposed annotation. This can be done, for example, by displaying the text "OK?" along with "yes" and "no" selectable responses, on the color display 332.

In block 420, the user selects either the "yes" or "no" response, using the user controls 334. If the annotation is not appropriate, the user selects the "no" response. This can happen if the user had a different place or event name in mind, such as "My House".

In block 422, if the user does not "OK" the annotation, ("no" to block 420) the digital processor 320 displays a user interface screen on the color display 332 which enables the user to edit the annotation. The alternate annotation can be selected from a list of frequently used labels (e.g. "town hall, park") or can be manually entered text strings. Alternatively, the alternate annotations can be selected from a database of previously used labels that are associated with nearby locations. If desired, annotations can be edited for all members of a group of capture records at the same time.

In block 424, if the user "OKs" the annotation, ("yes" to block 420), or if the user provides modified annotation in block 422, the digital processor 320 stores the annotation in the image file(s) of the captured image(s). For example, the annotation can be stored in the ImageDescription tag of the Exif file, which contains the captured still image.

Figure 11:
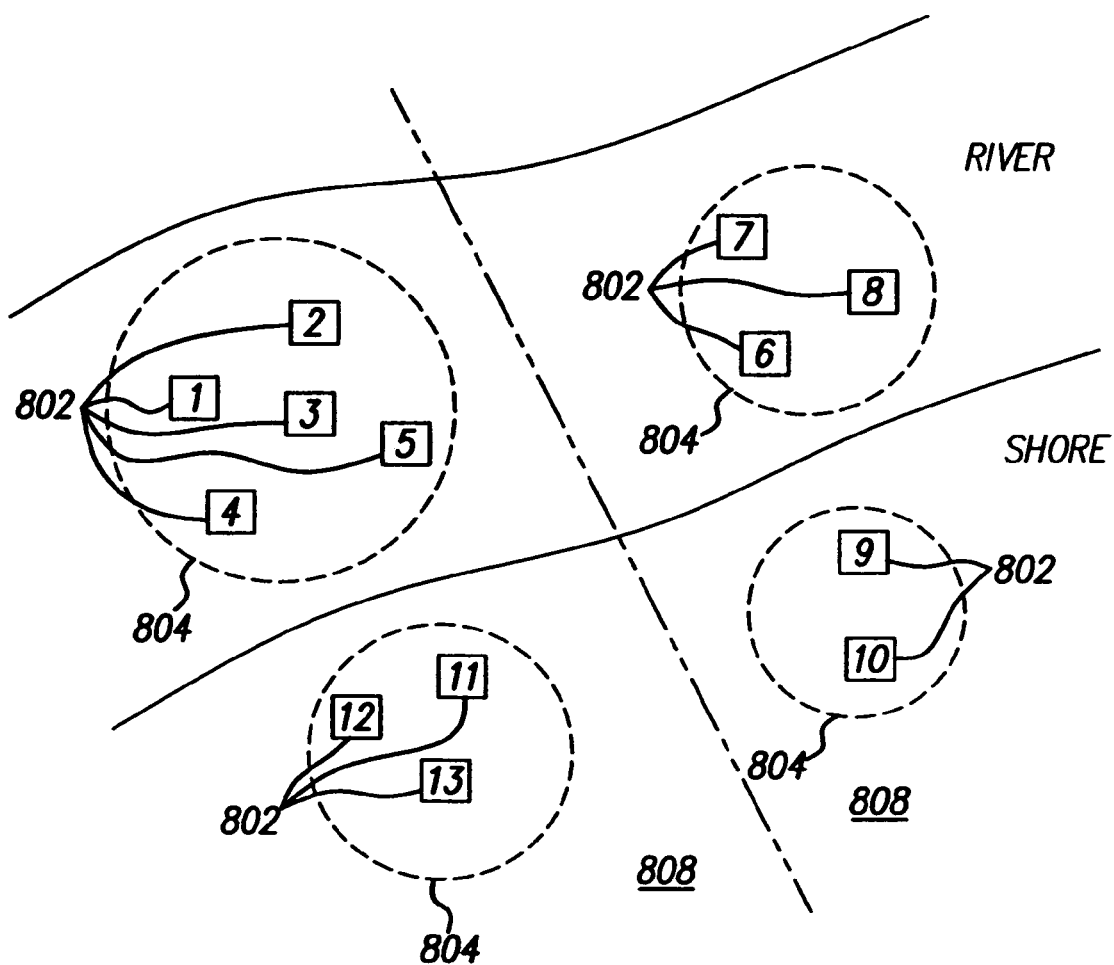
FIG. 11 shows another map segmented in accordance with the method of FIG. 1. Regions are separated by dash-dot lines. Clusters associated with each region are indicated by dashed lines.

In block 426, the image files are transferred to a database 12, for example provided by the photo service provider 372 of FIG. 11. This can be done, for example, by using the wireless modem 350 to transmit the image files over the mobile phone network 358 to the photo service provider 372. The photo service provider 372 can then store the image files, and enable them to be accessed by various computers, including general control computer 40, over the Internet 370. The image files can also be accessed by the digital camera phone 301, using the mobile phone network 358. Alternatively, the image files can be transferred to the general control computer 40 using the dock interface 362 and dock/recharger 364. The metadata in the image file, such as the Date/Time metadata and the special event labels stored using the ImageDescription tag, can also be read from each image file and stored in a separate metadata database along with the image name, to enable more rapid searching.

In block 430, the metadata of the database 720 is searched to locate images of interest. This can be accomplished by entering a query. The query may be a general query, or a field of a query specific to location. When the query is a general query, the query is analyzed by the query analyzer to extract portions of the query related to geographic location. The query can be in the form of a text query (either from keyboard input or spoken word). Keyword expansion can be used to expand the query to related words. The keyword expansion can be performed using techniques from the field of natural language expansion. For example, when the query is "canyons" the expanded query is "Grand Canyon", "Bryce Canyon", and the like.

Each of the additional query words added by the keyword expander has an associated keyword score based on the strength of the relationship between the additional query word and the original query. The expanded query is used to search the database for images and videos having annotations related with the expanded query terms. Continuing with the example, images and videos with the associated annotation "Grand Canyon" would be detected and returned as the query results for displaying to the user on the display device 120. Query results can be sorted according to a relevance score, the keyword score, the capture time of the image or video, alphabetically according to the name of the image or video, or the like. A user can inspect the results and use manual tools to refine mistakes made by the automatic retrieval of the images and videos.

The keyword expander may also act to recall geographic coordinates associated with particular word and use these coordinates to search the database for images captured sufficiently close to that location (or for images belonging to groups associated with geographic regions including). For example, if the user enters the query "photos at house" the keyword expander returns the expanded query of "43.18867 degrees N, 77.873711 degrees W." The query results are all those images in the database 720 having associated geographic locations sufficiently close to 43.18867 degrees N, 77.873711 degrees W. The term sufficiently close means that the distance between the query location and the geographic location associated with the image is small, for example less than 500 feet. It can also mean that the query location and the geographic location associated with the image are both in the same geographic region.

The query may also be input to the system by the user indicating a geographic location on a map shown on a display 120. For example, the user can click a location on a map. Then, the keyword expander finds geographic region(s) containing the indicated geographic location, and the expanded query produces query results which are the images having associated geographic locations within the geographic region. The user may also indicate whether the indicated geographic location corresponds to a precise location such as a state or a country. The query result can be the images, sorted in order of distance between the indicated geographic location and the geographic location associated with the image.

Those skilled in the art will recognize that the queries related to location can be combined, with the typical rules of logic such as and-ing the search terms, with queries related to other aspects of an image, for example, the capture time, or the identities of people in the image. In addition, while in the description the query searches a database 720 of images residing with the photo service provider 372, the location of the images is not material to the functionality provided. The images could be on a personal computer, a handheld device, or on the camera 301 itself.

In block 432, the images having metadata which best match the query are displayed. If the images are stored in the general control computer 40, they can be displayed on the display device 50. Alternatively, if the images are stored by the photo service provider 372, they can be transferred to the digital camera phone 301 using the mobile phone network 358 and displayed on the color display 332.

In block 434, the user can modify the metadata associated with particular photo events, in order to correct or augment the metadata labels. The modified metadata labels are then stored in the database 720.

The system can be used to aid travel. A user can select a destination image with associated geographic location information and a current location. The system then determines travel information from the current location to the geographic location associated with the destination image. For example, the user selects an image captured at a friend's house as the destination image in. Then the user enters his current address to the control computer. The travel information is then displayed to the user. The travel information can be generated because the source and destination are known. In this case, the travel information is driving directions from the current location to the friend's house. In this manner, an entire trip can be planned by selecting a sequence of destinations. This embodiment saves time because the user does not need to enter addresses.

The invention has been described in detail with particular reference to certain preferred embodiments thereof, but it will be understood that variations and modifications can be effected within the spirit and scope of the invention.

The invention claimed is:

1. A computerized method for classifying capture records recorded on a capture device, said method comprising the steps of:
providing a collection of capture records to a microprocessor-based unit, each said capture record having metadata defining a capture location;
clustering said capture records into a plurality of groups based on said capture locations;
defining each of said plurality of groups of capture records within an event threshold;
providing a map inclusive of said capture locations;
segmenting the map inclusive of said capture locations, into a plurality of regions based on relative positions of said capture locations associated with each group; and
identifying map locations beyond the event threshold as region boundaries separating the regions and associating the capture records with said groups based upon the region boundaries.

2. The method of claim 1 wherein said segmenting further comprises:
determining distances between said capture locations; and
segmenting said map into different ranges of geographical area based on said determined distances.

3. The method of claim 1 wherein said segmenting further comprises:
determining a core location of each of said groups, said core locations each being a function of the capture locations of the respective said group; and
segmenting said map based on relative separations of said capture locations from each of said core locations.

4. The method of claim 3 wherein said core locations are each one of: one or more of said capture locations of the respective said group, a combination of one or more of said capture locations of the respective said group, and a map location defined by the centroid of the respective said group.

5. The method of claim 3 wherein said capture locations in each of said regions are closer to the core location of the respective said region than to any other of said core locations.

6. The method of claim 1 wherein said clustering is also based upon a predetermined geographic feature of said map.

7. The method of claim 6 wherein said geographic feature is selected from the group consisting of: geographic areas, political subdivisions, and terrain types.

8. The method of claim 6 wherein said geographic feature defines a mapping of said capture locations into different semantic categories.

9. The method of claim 8 wherein said geographic feature defines a binary mapping of said capture locations into land and water.

10. The method of claim 1 wherein said metadata of each of said capture records defines a probability distribution and said clustering is in accordance with said probability distributions.

11. The method of claim 1 wherein said clustering places each of said capture records exclusively in one of said groups.

12. The method of claim 1 wherein said providing further comprises:
supplying a plurality of additional capture records lacking said metadata;
estimating capture locations of each of said additional capture records from said metadata of one or more of said capture records of said collection of capture records to provide estimated capture locations; and
assigning respective said estimated capture locations to each of said additional capture records.

13. The method of claim 1 wherein said providing further comprises:
receiving, with a camera, a stream of periodic data transmissions, each said data transmission defining a map location;
capturing a plurality of located capture records captured during said periodic data transmissions
associating with each of said located capture records the map location defined by the concurrent said data transmission to provide respective said metadata defining a capture location.

14. The method of claim 13 wherein said geopositioning data further comprise one or more of: locally and remotely transmitted geographic coordinates, identifications of cell sites, wired and wireless network addresses, and transmitted and user input place names.

15. The method of claim 1 wherein said providing further comprises:
receiving, with a camera, a stream of periodic data transmissions interrupted by one or more gaps in transmission , each said data transmission defining a map location;
capturing a sequence of capture records with the camera, said sequence including one or more located capture records captured during said periodic data transmissions and one or more non-located capture records captured during said gaps in transmission;
associating with each of said located capture records the map location defined by the concurrent said data transmission to provide respective said metadata defining a capture location;
associating with each of said non-located capture records a nominal map location within a geographic area delimited by the map locations of the data transmissions bounding the gap in transmission concurrent with the respective said non-located capture record to provide respective said metadata defining a capture location.

16. The method of claim 15 further comprising:
determining temporal separations between each of said non-located capture records and each of said data transmissions bounding a respective said gap in transmission; and
interpolating each of said nominal map locations between the capture locations of ones of said located capture records concurrent with said data transmissions bounding the respective said gap in transmission, said interpolating being proportional to the respective said temporal separation.

17. The method of claim 1 wherein each of said capture records has associated supplemental metadata additional to said metadata defining a capture location and said clustering is also based on said supplemental metadata.

18. The method of claim 17 wherein said supplemental metadata is data-time information.

19. The method of claim 18 further comprising scaling said supplemental metadata prior to said clustering.

20. The method of claim 1 wherein said capture records each include one or more of: still images, video sequences, audio sequences, and combinations thereof.

21. The method of claim 1 further comprising associating a common annotation with each of said images of one or more of said groups.

22. The method of claim 21 wherein said annotation is a place name on said map.

23. A computer program product for capture record classification, the computer program product comprising computer readable storage medium having a computer program stored thereon for performing the steps of claim 1.

24. A computerized method for classifying capture records, said method comprising the steps of:
providing a plurality of capture records recorded on a capture device to a microprocessor-based unit, each said capture record having metadata defining a capture location;
clustering said capture records into a two or more groups based on said capture locations;
determining distances between said capture locations;
defining each of said two or more groups of capture records within an event threshold;
providing a map inclusive of said capture locations;
segmenting the map inclusive of said capture locations, into a plurality of regions based on said determined distances; and
identifying map locations beyond the event threshold as region boundaries separating the regions into different ranges of geographic area and associating said regions with the capture records of respective with said groups based upon the region boundaries so that groups of capture records are encompassed within different ranges of geographic area.

25. The method of claim 24 wherein said clustering places each of said capture records exclusively in one of said groups.

26. The method of claim 25 wherein said regions each include a cluster center of a respective one of said groups and said regions are everywhere closer to the respective said cluster center than to the other said cluster centers.

27. A computerized method for classifying capture records, said method comprising the steps of:
providing a collection of capture records to a microprocessor-based unit, each said capture record having metadata defining a capture location;
clustering said capture records into a plurality of groups based on said capture locations;
determining a core location of each of said groups, said core locations each being a function of the capture locations of the respective said group;
defining each of said groups of capture records within an event threshold;
segmenting a map inclusive of said capture locations, into a plurality of regions based on relative separations of said capture locations from each of said core locations; and
identifying map locations beyond the event threshold as region boundaries separating the regions into different ranges of geographic area and associating said regions with the capture records of respective said groups based upon the region boundaries so that groups of capture records are encompassed within different ranges of geographic area.

28. A classification method for use with a camera, said method comprising the steps of:
receiving, with the camera, a stream of data transmissions, each said data transmission defining a map location;
capturing a sequence of capture records with the camera, said sequence including one or more located capture records captured concurrent with said data transmissions;
assigning to each of said located capture records the map location of a concurrent one of said data transmissions to provide respective capture locations;
clustering all of said capture records into groups based upon said capture locations;
segmenting a map inclusive of said capture locations, into a plurality of regions based on relative positions of said capture locations associated with each group; and
identifying map locations beyond the map location of said concurrent one of said data transmissions as region boundaries separating each region into different ranges of area and separating said groups based upon the region boundaries so that the groups of capture records are assigned locations within different ranges of area.

29. The method of claim 28 wherein said stream is periodic and is interrupted by one or more gaps in transmission; and said method further comprises:
capturing one or more non-located capture records during said gaps in transmission;
assigning to each of said non-located capture records a nominal map location within a geographic area of said map delimited by the capture locations of the data transmissions bounding the gap in transmission concurrent with the respective said non-located capture record;
treating said nominal map locations as capture locations during said clustering.

30. The method of claim 29 wherein said providing further comprises ascertaining date-times of capture of said located capture records and date-times of receipt of said data transmissions, and wherein said assigning steps use said date-times.

31. The method of claim 30 further comprising the steps of:
determining temporal separations between each of said non-located capture records and each of said data transmissions bounding a respective said gap in transmission; and
interpolating each of said nominal map locations between the capture locations of respective said located capture records corresponding to said data transmissions bounding a respective said gap in transmission, said interpolating being proportional to respective said temporal separations.

32. The method of claim 28 wherein said capture records include at least one of: still images and video sequences.

33. The method of claim 28 further comprising the steps of:
receiving a plurality of external capture records having preassigned map locations; and
treating said preassigned map locations as capture locations during said clustering.

34. The method of claim 33 further comprising:
prior to said receiving, loading said external capture records into storage remote from said camera; and
assigning a default map location defined by said loading, to each of said external capture records to provide said preassigned locations.

35. The method of claim 28 wherein each of said capture records has associated supplemental metadata additional to said geopositioning data and said clustering is also based upon said supplemental metadata.

36. The method of claim 35 wherein said supplemental metadata is data-time information.

37. The method of claim 35 further comprising scaling said supplemental metadata prior to said clustering.

38. The method of claim 1 further comprising determining a geographic feature of interest, and said clustering is also based upon relative distances from said geographic feature.

39. The method of claim 1 wherein said geopositioning data further comprise one or more of: locally and remotely transmitted geographic coordinates, identifications of cell sites, wired and wireless network addresses, and transmitted and user input place names.

40. A capture system comprising:
a classification engine clustering all capture records into groups based upon a capture location associated with each of said capture records; defining each of said groups of capture records within an event threshold; segmenting a map inclusive of said capture locations, into a plurality of regions based on relative positions of said capture locations associated with each group; identifying map locations beyond the event threshold as region boundaries to define the regions as different ranges of area and associating said regions with the capture records of respective said groups.

41. The system of claim 40 wherein said segmenting further comprises:
determining distances between said capture locations; and
partitioning said map based on said determined distances.

42. The system of claim 40 wherein said segmenting further comprises:
determining a core location of each of said groups, said core locations each being a function of the capture locations of the respective said group; and
partitioning said map based on relative separations of said capture locations from each of said core locations.

43. The system of claim 42 wherein said core locations are each one of: one or more of said capture locations of the respective said group, a combination of one or more of said capture locations of the respective said group, and a map location defined by the centroid of the respective said group.

44. The method of claim 42 wherein said capture locations in each of said regions are closer to the core location of the respective said region than to any other of said core locations.

45. The method of claim 40 wherein said clustering is also based upon a predetermined geographic feature of said map.

46. The system of claim 40 further comprising a capture device including:
a geolocation information receiver operable to receive a stream of data transmissions defining locations;
a capture unit joined to said geopositioning system, said capture unit being operable to capture a sequence of capture records;
a memory storing said capture records;
a controller operatively connected to said memory and said receiver, said controller associating concurrent ones of said data transmissions and said capture records.

47. The system of claim 46 further comprising a location determiner capable of determining respective said map locations from said data transmissions, said location determiner being physically associated with one of said classification engine and said capture device and physically remote from the other of said classification engine and said capture device.

48. The system of claim 40 wherein said associated data transmissions each define a capture location; said stream of data transmissions is interrupted by gaps; said camera includes an estimator estimating nominal map locations of said capture records concurrent with said gaps, and said classification engine treats said nominal map locations as capture locations.

49. A classification method for use with a camera, said method comprising the steps of:
receiving, with the camera, a stream of periodic data transmissions interrupted by one or more gaps in transmission, each said data transmission defining a map location;
capturing a sequence of capture records with the camera, said sequence including one or more located capture records captured during said periodic data transmissions and one or more non-located capture records captured during said gaps in transmission;
assigning to each of said located capture records the map location of a concurrent one of said data transmissions to provide capture locations;
assigning to each of said non-located capture records a nominal location within a geographic area of said map delimited by the capture locations of the data transmissions bounding the concurrent said gap in transmission;
clustering all of said capture records into groups based upon said assigned locations;
treating said nominal locations as capture locations during said clustering; and
identifying map locations beyond the map location of said concurrent one of said data transmissions as region boundaries separating the regions into different ranges of area and separating said groups based upon the region boundaries so that the groups of capture records are assigned locations within different ranges of area.

* * * * *